(12) United States Patent
Isono

(10) Patent No.: US 8,013,724 B2
(45) Date of Patent: Sep. 6, 2011

(54) TIRE-PRESSURE CONTROL APPARATUS

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 811 days.

(21) Appl. No.: 12/090,492

(22) PCT Filed: Aug. 10, 2007

(86) PCT No.: PCT/JP2007/065982
§ 371 (c)(1),
(2), (4) Date: Apr. 17, 2008

(87) PCT Pub. No.: WO2008/041423
PCT Pub. Date: Apr. 10, 2008

(65) Prior Publication Data
US 2009/0048733 A1    Feb. 19, 2009

(30) Foreign Application Priority Data

Sep. 29, 2006  (JP) ................................. 2006-268534
Jul. 30, 2007  (JP) ................................. 2007-197672

(51) Int. Cl.
*B60C 23/00* (2006.01)
(52) U.S. Cl. ........ 340/442; 340/443; 340/444; 152/419; 73/146
(58) Field of Classification Search .................. 340/442, 340/443, 444; 152/416, 417, 418, 419; 73/146, 73/146.2; 701/69; 156/110.1, 157, 317, 156/416
See application file for complete search history.

(56) References Cited

U.S. PATENT DOCUMENTS

| | | | |
|---|---|---|---|
| 6,439,045 B1 * | 8/2002 | Latarnik et al. | 73/146.5 |
| 2006/0102268 A1 * | 5/2006 | Loewe | 152/415 |
| 2008/0135151 A1 * | 6/2008 | Loewe | 152/419 |
| 2008/0156406 A1 * | 7/2008 | Breed | 152/415 |

FOREIGN PATENT DOCUMENTS

| | | |
|---|---|---|
| EP | 0 166 123 | 1/1986 |
| EP | 0 343 990 | 11/1989 |
| EP | 0 601 556 | 6/1994 |
| EP | 1 571 011 | 9/2005 |
| JP | 2 20408 | 1/1990 |
| JP | 7 137515 | 5/1995 |
| JP | 2005 515923 | 6/2005 |

* cited by examiner

*Primary Examiner* — John Nguyen
*Assistant Examiner* — Jordan Fei
(74) *Attorney, Agent, or Firm* — Oblon, Spivak, McClelland, Maier & Neustadt, L.L.P.

(57) ABSTRACT

A tire-pressure control apparatus includes time calculation means for calculating an up time over which the tire pressure of each wheel increases from a lower limit set value to an upper limit set value and a down time over which the tire pressure of the wheel decreases from the upper limit set value to the lower limit set value, on the basis of the detection value of a corresponding pressure sensor; average-rotational-speed calculation means for calculating an average rotational speed of the wheel during the up time on the basis of the detection value of a corresponding wheel speed sensor; first-pump-supplied-air-quantity calculation means (403) for calculating a first pump-supplied air quantity Qvw* of a corresponding air pressure generation unit in a single generation and non-generation cycle on the basis of the up time and the average rotational speed; second-pump-supplied-air-quantity calculation means (404) for calculating a second pump-supplied air quantity Qp* of the air pressure generation unit in a single generation and non-generation cycle on the basis of the up time and the down time; and determination means (405) for comparing the first pump-supplied air quantity Qvw* and the second pump-supplied air quantity Qp*.

6 Claims, 9 Drawing Sheets

TIRE-PRESSURE CONTROL APPARATUS

TECHNICAL FIELD

The present invention relates to a tire-pressure control apparatus for a vehicle, and particularly to a tire-pressure control apparatus which includes a plurality of wheel speed sensors for respectively detecting rotational speeds of a plurality of wheels of the vehicle, a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value, and a plurality of pressure sensors respectively detecting the tire pressures of the plurality of wheels.

BACKGROUND ART

There has been known to provide a plurality of wheel speed sensors in a vehicle, such as an automobile, in order to detect rotational speeds of a plurality of wheels of the vehicle. Further, Japanese kohyo (PCT) Patent Publication No. 2005-515923 discloses an air pressure generation unit provided for each wheel and including an air pump driven through rotation of the wheel so as to generate compressed air to be supplied to a tire air chamber of the wheel and being capable of maintaining a tire pressure of the wheel between a lower limit set value and an upper limit set value. Moreover, Japanese Patent Application Laid-Open (kokai) No. H7-137515 discloses a plurality of pressure sensors respectively detecting the tire pressures of a plurality of wheels.

Therefore, in a tire-pressure control apparatus provided in a vehicle such as an automobile, it is possible to provide the above-described air pressure generation unit for each of a plurality of wheels so as to maintain the tire pressure of the wheel between a lower limit set value and an upper limit set value, and to detect and monitor the tire pressure of each wheel by use of a pressure sensor. However, the conventional techniques cannot determine whether each air pressure generation unit is normal or anomalous and whether each wheel speed sensor and each pressure sensor are normal or anomalous. Therefore, there is room for improvement of the reliability of the tire-pressure control apparatus.

DISCLOSURE OF THE INVENTION

An object of the present invention is to provide a tire-pressure control apparatus having an improved reliability.

The present invention provides a tire-pressure control apparatus which comprises a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of pressure sensors respectively detecting the tire pressures of the plurality of wheels. For each wheel, the tire-pressure control apparatus comprises up-time calculation means for calculating an up time ($Tpu^*$), which is a time period over which the tire pressure of the wheel increases from the lower limit set value to the upper limit set value, on the basis of a detection value of the corresponding pressure sensor; down-time calculation means for calculating a down time ($Tpd^*$), which is a time period over which the tire pressure of the wheel decreases from the upper limit set value to the lower limit set value, on the basis of the detection value of the pressure sensor; average-rotational-speed calculation means for calculating an average rotational speed ($V^*$) of the wheel during the up time calculated by the up-time calculation means, on the basis of the detection value of the wheel speed sensor; first-pump-supplied-air-quantity calculation means for calculating a first pump-supplied air quantity ($Qvw^*$) of the corresponding air pressure generation unit in a single generation and non-generation cycle on the basis of the up time ($Tpu^*$) and the average rotational speed ($V^*$); second-pump-supplied-air-quantity calculation means for calculating a second pump-supplied air quantity ($Qp^*$) of the air pressure generation unit in a single generation and non-generation cycle on the basis of the up time ($Tpu^*$) and the down time ($Tpd^*$); and determination means for comparing the first pump-supplied air quantity ($Qvw^*$) and the second pump-supplied air quantity ($Qp^*$). In this case, the results of the determination by the determination means may be reported to a driver by use of reporting means.

In this tire-pressure control apparatus, the first-pump-supplied-air-quantity calculation means calculates a first pump-supplied air quantity ($Qvw^*$) of the air pressure generation unit in a single generation and non-generation cycle, on the basis of the up time ($Tpu^*$) calculated on the basis of the detection value of the corresponding pressure sensor and the average rotational speed ($V^*$) calculated on the basis of the detection value of the corresponding wheel speed sensor; and the second-pump-supplied-air-quantity calculation means calculates a second pump-supplied air quantity ($Qp^*$) of the air pressure generation unit in a single generation and non-generation cycle on the basis of the up time ($Tpu^*$) calculated on the basis of the detection value of the corresponding pressure sensor and the down time ($Tpd^*$) calculated on the basis of the detection value of the corresponding pressure sensor.

Incidentally, when the wheel speed sensor, the air pressure generation unit, and the pressure sensor for a certain wheel are all normal, the first pump-supplied air quantity ($Qvw^*$) calculated by the first-pump-supplied-air-quantity calculation means for the wheel and the second pump-supplied air quantity ($Qp^*$) calculated by the second-pump-supplied-air-quantity calculation means for the wheel must assume generally the same value.

Therefore, when the results of the determination by the determination means indicate that the difference between the first pump-supplied air quantity ($Qvw^*$) calculated by the first-pump-supplied-air-quantity calculation means and the second pump-supplied air quantity ($Qp^*$) calculated by the second-pump-supplied-air-quantity calculation means is smaller than a set value, all the wheel speed sensor, the air pressure generation unit, and the pressure sensor for the certain wheel are determined to be normal; and when the results of the determination by the determination means indicate that the difference between the first pump-supplied air quantity ($Qvw^*$) calculated by the first-pump-supplied-air-quantity calculation means and the second pump-supplied air quantity ($Qp^*$) calculated by the second-pump-supplied-air-quantity calculation means is greater than the set value, the wheel speed sensor or the air pressure generation unit or the pressure sensor for the certain wheel is determined to be anomalous. Accordingly, the reliability of the tire-pressure control apparatus can be improved.

The present invention also provides a tire-pressure control apparatus which comprises a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of pressure sensors respectively detecting the tire pressures of the plurality of wheels. For each wheel, the tire-pressure control apparatus comprises wheel-speed-sensor determination means for determining whether the corresponding wheel speed sensor is normal or anomalous on the basis of a detection value of the wheel speed sensor; up-time calculation means for calculating an up time (Tpu*), which is a time period over which the tire pressure of the wheel increases from the lower limit set value to the upper limit set value, on the basis of a detection value of the corresponding pressure sensor; down-time calculation means for calculating a down time (Tpd*), which is a time period over which the tire pressure of the wheel decreases from the upper limit set value to the lower limit set value, on the basis of the detection value of the pressure sensor; average-rotational-speed calculation means for calculating an average rotational speed (V*) of the wheel during the up time calculated by the up-time calculation means, on the basis of the detection value of the wheel speed sensor; first-pump-supplied-air-quantity calculation means for calculating a first pump-supplied air quantity (Qvw*) of the corresponding air pressure generation unit in a single generation and non-generation cycle on the basis of the up time (Tpu*) and the average rotational speed (V*); second-pump-supplied-air-quantity calculation means for calculating a second pump-supplied air quantity (Qp*) of the air pressure generation unit in a single generation and non-generation cycle on the basis of the up time (Tpu*) and the down time (Tpd*); and system determination means, operable when the wheel-speed-sensor determination means determines that the corresponding wheel speed sensor is normal, for determining whether the air pressure generation unit and the pressure sensor are normal or anomalous on the basis of the difference between the first pump-supplied air quantity (Qvw*) and the second pump-supplied air quantity (Qp*). In this case, the results of the determination by the wheel-speed-sensor determination means and the results of the determination by the system determination means may be reported to a driver by use of reporting means.

In this tire-pressure control apparatus, the first-pump-supplied-air-quantity calculation means calculates a first pump-supplied air quantity (Qvw*) of the air pressure generation unit in a single generation and non-generation cycle, on the basis of the up time (Tpu*) calculated on the basis of the detection value of the corresponding pressure sensor and the average rotational speed (V*) calculated on the basis of the detection value of the corresponding wheel speed sensor; and the second-pump-supplied-air-quantity calculation means calculates a second pump-supplied air quantity (Qp*) of the air pressure generation unit in a single generation and non-generation cycle on the basis of the up time (Tpu*) calculated on the basis of the detection value of the corresponding pressure sensor and the down time (Tpd*) calculated on the basis of the detection value of the corresponding pressure sensor.

Further, the wheel-speed-sensor determination means determines whether the wheel speed sensor is normal or anomalous on the basis of a detection value of the wheel speed sensor. Moreover, when the wheel-speed-sensor determination means determines that the wheel speed sensor is normal, the system determination means determines whether the air pressure generation unit and the pressure sensor are normal or anomalous, on the basis of the difference between the first pump-supplied air quantity (Qvw*) calculated by the first-pump-supplied-air-quantity calculation means and the second pump-supplied air quantity (Qp*) calculated by the second-pump-supplied-air-quantity calculation means.

Therefore, it is possible to determine whether the wheel speed sensor for a certain wheel is normal or anomalous on the basis of the results of determination by the corresponding wheel-speed-sensor determination means and to determine whether the air pressure generation unit and the pressure sensor for the certain wheel are normal or anomalous on the basis of the results of determination by the corresponding system determination means. Accordingly, the reliability of the tire-pressure control apparatus can be improved.

During the determination as to whether the air pressure generation unit and the pressure sensor are normal or anomalous, the system determination means determines that both the air pressure generation unit and the pressure sensor for the certain wheel are normal when the difference between the first pump-supplied air quantity (Qvw*) calculated by the first-pump-supplied-air-quantity calculation means and the second pump-supplied air quantity (Qp*) calculated by the second-pump-supplied-air-quantity calculation means is smaller than a set value, and determines that the air pressure generation unit or the pressure sensor for the certain wheel is anomalous when the difference between the first pump-supplied air quantity (Qvw*) calculated by the first-pump-supplied-air-quantity calculation means and the second pump-supplied air quantity (Qp*) calculated by the second-pump-supplied-air-quantity calculation means is greater than the set value.

The present invention also provides a tire-pressure control apparatus which comprises a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; a plurality of pressure sensors respectively detecting the tire pressures of the plurality of wheels; and a plurality of mode sensors each detecting whether the corresponding air pressure generation unit is in a generation-state or in a non-generation state. For each wheel, the tire-pressure control apparatus comprises wheel-speed-sensor determination means for determining whether the corresponding wheel speed sensor is normal or anomalous on the basis of a detection value of the wheel speed sensor; up-time calculation means for calculating an up time (Tpu*), which is a time period over which the tire pressure of the wheel increases from the lower limit set value to the upper limit set value, on the basis of a detection value of the corresponding pressure sensor; down-time calculation means for calculating a down time (Tpd*), which is a time period over which the tire pressure of the wheel decreases from the upper limit set value to the lower limit set value, on the basis of the detection value of the pressure sensor; average-rotational-speed calculation means for calculating an average rotational speed (V*) of the wheel during the up time calculated by the up-time calculation means, on the basis of the detection value of the wheel speed sensor; first-pump-supplied-air-quantity calculation means for calculating a first pump-supplied air quantity (Qvw*) of the corresponding air pressure generation unit in a single generation and non-generation cycle on the basis of the up time (Tpu*) and the average rotational speed (V*); second-pump-supplied-air-quantity calculation means for calculating a second pump-supplied air quantity (Qp*) of the air pressure generation unit in a single generation and non-generation cycle on the basis of the up time (Tpu*) and the down time (Tpd*); generation-state-maintaining-time calculation means for calculating a generation-state maintaining time (Tmu*), in which the air pressure generation unit is maintained in a generation state, on the basis of a detection value of the corresponding mode sensor; non-generation-state-maintaining-time calculation means for calculating a non-generation-state maintaining time (Tmd*), in which the air pressure generation unit is maintained in a non-generation state, on the basis of the detection value of the mode sensor; third-pump-supplied-air-quantity calculation means for calculating a third pump-supplied air quantity (Qt*) of the air pressure generation unit in a single generation and non-generation cycle on the basis of the generation-state maintaining time (Tmu*) and the non-generation-state maintaining time (Tmd*); system determination means, operable when the wheel-speed-sensor determination means determines that the corresponding wheel speed sensor is normal, for determining whether the corresponding air pump and the corresponding pressure sensor are normal or anomalous on the basis of the difference between the first pump-supplied air quantity (Qvw*) and the second pump-supplied air quantity (Qp*); mode determination means, operable when the system determination means determines that the air pump and the pressure sensor are normal, for determining whether the corresponding mode sensor is normal or anomalous on the basis of the difference between the first pump-supplied air quantity (Qvw*) and the third pump-supplied air quantity (Qt*); and air-pump/pressure-sensor determination means, operable when the system determination means determines that either of the air pump and the pressure sensor is anomalous, for determining which one of the air pump and the pressure sensor is anomalous on the basis of the difference between the first pump-supplied air quantity (Qvw*) and the third pump-supplied air quantity (Qt*). In this case, the results of the determination by the wheel-speed-sensor determination means, the results of the determination by the mode determination means, and the results of the determination by the air-pump/pressure-sensor determination means may be reported to a driver by use of reporting means.

In this tire-pressure control apparatus, the first-pump-supplied-air-quantity calculation means calculates a first pump-supplied air quantity (Qvw*) of the air pressure generation unit in a single generation and non-generation cycle, on the basis of the up time (Tpu*) calculated on the basis of the detection value of the corresponding pressure sensor and the average rotational speed (V*) calculated on the basis of the detection value of the corresponding wheel speed sensor; and the second-pump-supplied-air-quantity calculation means calculates a second pump-supplied air quantity (Qp*) of the air pressure generation unit in a single generation and non-generation cycle on the basis of the up time (Tpu*) calculated on the basis of the detection value of the corresponding pressure sensor and the down time (Tpd*) calculated on the basis of the detection value of the corresponding pressure sensor. Moreover, the third-pump-supplied-air-quantity calculation means for calculating a third pump-supplied air quantity (Qt*) of the air pressure generation unit in a single generation and non-generation cycle, on the basis of the generation-state maintaining time (Tmu*) calculated on the basis of the detection value of the corresponding mode sensor and the non-generation-state maintaining time (Tmd*) calculated on the basis of the detection value of the mode sensor.

Further, the wheel-speed-sensor determination means determines whether the wheel speed sensor is normal or anomalous on the basis of a detection value of the wheel speed sensor. Moreover, when the wheel-speed-sensor determination means determines that the wheel speed sensor is normal, the system determination means determines whether the air pump and the pressure sensor are normal or anomalous, on the basis of the difference between the first pump-supplied air quantity (Qvw*) calculated by the first-pump-supplied-air-quantity calculation means and the second pump-supplied air quantity (Qp*) calculated by the second-pump-supplied-air-quantity calculation means.

Further, when the system determination means determines that the air pump and the pressure sensor are normal, the mode determination means determines whether the corresponding mode sensor is normal or anomalous, on the basis of the difference between the first pump-supplied air quantity (Qvw*) calculated by the corresponding first-pump-supplied-air-quantity calculation means and the third pump-supplied air quantity (Qt*) calculated by the corresponding third-pump-supplied-air-quantity calculation means. Moreover, when the system determination means determines that either of the air pump and the pressure sensor is anomalous, the air-pump/pressure-sensor determination means determines which one of the air pump and the pressure sensor is anomalous, on the basis of the difference between the first pump-supplied air quantity (Qvw*) calculated by the corresponding first-pump-supplied-air-quantity calculation means and the third pump-supplied air quantity (Qt*) calculated by the corresponding third-pump-supplied-air-quantity calculation means.

Therefore, it is possible to determine whether the wheel speed sensor for a certain wheel is normal or anomalous on the basis of the results of determination by the corresponding wheel-speed-sensor determination means and to determine whether the air pump and the pressure sensor for the certain wheel are normal or anomalous on the basis of the results of determination by the corresponding system determination means. Further, it is possible to determine whether the mode sensor for the certain wheel is normal or anomalous on the basis of the results of determination by the corresponding mode determination means and to determine which one of the air pump and the pressure sensor for the certain wheel is anomalous on the basis of the results of determination by the corresponding air-pump/pressure-sensor determination means. Accordingly, the reliability of the tire-pressure control apparatus can be improved.

During the determination as to whether the air pump and the pressure sensor are normal or anomalous, the system determination means determines that both the air pump and the pressure sensor for the certain wheel are normal when the difference between the first pump-supplied air quantity (Qvw*) calculated by the corresponding first-pump-supplied-air-quantity calculation means and the second pump-supplied air quantity (Qp*) calculated by the second-pump-supplied-air-quantity calculation means is smaller than a set value, and determines that the air pump or the pressure sensor for the certain wheel is anomalous when the difference between the first pump-supplied air quantity (Qvw*) calculated by the corresponding first-pump-supplied-air-quantity calculation means and the second pump-supplied air quantity (Qp*) calculated by the second-pump-supplied-air-quantity calculation means is greater than the set value.

The present invention also provides a tire-pressure control apparatus which comprises a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of mode sensors each detecting whether the corresponding air pressure generation unit is in a generation-state or in a non-generation state. For each wheel, the tire-pressure control apparatus comprises generation-state-maintaining-time calculation means for calculating a generation-state maintaining time, in which the air pressure generation unit is maintained in a generation state, on the basis of a detection value of the corresponding mode sensor; non-generation-state-maintaining-time calculation means for calculating a non-generation-state maintaining time, in which the air pressure generation unit is maintained in a non-generation state, on the basis of the detection value of the mode sensor; average-rotational-speed calculation means for calculating an average rotational speed of the wheel during the generation-state maintaining time calculated by the generation-state-maintaining-time calculation means, on the basis of the detection value of the wheel speed sensor; fourth-pump-supplied-air-quantity calculation means for calculating a fourth pump-supplied air quantity of the corresponding air pressure generation unit in a single generation and non-generation cycle on the basis of the generation-state maintaining time and the average rotational speed; third-pump-supplied-air-quantity calculation means for calculating a third pump-supplied air quantity of the air pressure generation unit in a single generation and non-generation cycle on the basis of the generation-state maintaining time and the non-generation-state maintaining time; and determination means for comparing the fourth pump-supplied air quantity and the third pump-supplied air quantity. In this case, the results of the determination by the determination means may be reported to a driver by use of reporting means.

In this tire-pressure control apparatus, the fourth-pump-supplied-air-quantity calculation means calculates a fourth pump-supplied air quantity of the air pressure generation unit in a single generation and non-generation cycle, on the basis of the generation-state maintaining time calculated on the basis of the detection value of the corresponding mode sensor and the average rotational speed calculated on the basis of the detection value of the corresponding wheel speed sensor; and the third-pump-supplied-air-quantity calculation means calculates a third pump-supplied air quantity of the air pressure generation unit in a single generation and non-generation cycle on the basis of the generation-state maintaining time calculated on the basis of the detection value of the corresponding mode sensor and the non-generation-state maintaining time calculated on the basis of the detection value of the corresponding mode sensor.

Incidentally, when the wheel speed sensor, the air pressure generation unit, and the mode sensor for a certain wheel are all normal, the fourth pump-supplied air quantity calculated by the fourth-pump-supplied-air-quantity calculation means for the wheel and the third pump-supplied air quantity calculated by the third-pump-supplied-air-quantity calculation means for the wheel must assume generally the same value.

Therefore, when the results of the determination by the determination means indicate that the difference between the fourth pump-supplied air quantity calculated by the corresponding fourth-pump-supplied-air-quantity calculation means and the third pump-supplied air quantity calculated by the third-pump-supplied-air-quantity calculation means is smaller than a set value, all the wheel speed sensor, the air pressure generation unit, and the mode sensor for the certain wheel are determined to be normal; and when the results of the determination by the determination means indicate that the difference between the fourth pump-supplied air quantity calculated by the fourth-pump-supplied-air-quantity calculation means and the third pump-supplied air quantity calculated by the third-pump-supplied-air-quantity calculation means is greater than the set value, the wheel speed sensor or the air pressure generation unit or the mode sensor for the certain wheel is determined to be anomalous. Accordingly, the reliability of the tire-pressure control apparatus can be improved.

The present invention also provides a tire-pressure control apparatus which comprises a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of mode sensors each detecting whether the corresponding air pressure generation unit is in a generation-state or in a non-generation state. For each wheel, the tire-pressure control apparatus comprises wheel-speed-sensor determination means for determining whether the corresponding wheel speed sensor is normal or anomalous on the basis of a detection value of the wheel speed sensor; generation-state-maintaining-time calculation means for calculating a generation-state maintaining time, in which the air pressure generation unit is maintained in a generation state, on the basis of a detection value of the corresponding mode sensor; non-generation-state-maintaining-time calculation means for calculating a non-generation-state maintaining time, in which the air pressure generation unit is maintained in a non-generation state, on the basis of the detection value of the mode sensor; average-rotational-speed calculation means for calculating an average rotational speed of the wheel during the generation-state maintaining time calculated by the generation-state-maintaining-time calculation means, on the basis of the detection value of the wheel speed sensor; fourth-pump-supplied-air-quantity calculation means for calculating a fourth pump-supplied air quantity of the corresponding air pressure generation unit in a single generation and non-generation cycle on the basis of the generation-state maintaining time and the average rotational speed; third-pump-supplied-air-quantity calculation means for calculating a third pump-supplied air quantity of the air pressure generation unit in a single generation and non-generation cycle on the basis of the generation-state maintaining time and the non-generation-state maintaining time; and system determination means, operable when the wheel-speed-sensor determination means determines that the corresponding wheel speed sensor is normal, for determining whether the air pressure generation unit and the mode sensor are normal or anomalous on the basis of the difference between the fourth pump-supplied air quantity and the third pump-supplied air quantity. In this case, the results of the determination by the wheel-speed-sensor determination means and the results of the determination by the system determination means may be reported to a driver by use of reporting means.

In this tire-pressure control apparatus, the fourth-pump-supplied-air-quantity calculation means calculates a fourth pump-supplied air quantity of the air pressure generation unit in a single generation and non-generation cycle, on the basis of the generation-state maintaining time calculated on the basis of the detection value of the corresponding mode sensor and the average rotational speed calculated on the basis of the detection value of the corresponding wheel speed sensor; and the third second-pump-supplied-air-quantity calculation means calculates a third pump-supplied air quantity of the air pressure generation unit in a single generation and non-generation cycle, on the basis of the generation-state maintaining time calculated on the basis of the detection value of the corresponding mode sensor and the non-generation-state maintaining time calculated on the basis of the detection value of the mode sensor.

Further, the wheel-speed-sensor determination means determines whether the wheel speed sensor is normal or anomalous on the basis of a detection value of the wheel speed sensor. Moreover, when the wheel-speed-sensor determination means determines that the wheel speed sensor is normal, the system determination means determines whether the air pressure generation unit and the mode sensor are normal or anomalous, on the basis of the difference between the fourth pump-supplied air quantity calculated by the fourth-pump-supplied-air-quantity calculation means and the third pump-supplied air quantity calculated by the third-pump-supplied-air-quantity calculation means.

Therefore, it is possible to determine whether the wheel speed sensor for a certain wheel is normal or anomalous on the basis of the results of determination by the corresponding wheel-speed-sensor determination means and to determine whether the air pressure generation unit and the mode sensor for the certain wheel are normal or anomalous on the basis of the results of determination by the corresponding system determination means. Accordingly, the reliability of the tire-pressure control apparatus can be improved.

During the determination as to whether the air pressure generation unit and the mode sensor are normal or anomalous, the system determination means determines that both the air pressure generation unit and the mode sensor for the certain wheel are normal when the difference between the fourth pump-supplied air quantity calculated by the fourth-pump-supplied-air-quantity calculation means and the third pump-supplied air quantity calculated by the third-pump-supplied-air-quantity calculation means is smaller than a set value, and determines that the air pressure generation unit or the mode sensor for the certain wheel is anomalous when the difference between the fourth pump-supplied air quantity calculated by the fourth-pump-supplied-air-quantity calculation means and the third pump-supplied air quantity calculated by the third-pump-supplied-air-quantity calculation means is greater than the set value.

The present invention also provides a tire-pressure control apparatus which comprises a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; a plurality of pressure sensors respectively detecting the tire pressures of the plurality of wheels; and a plurality of mode sensors each detecting whether the corresponding air pressure generation unit is in a generation-state or in a non-generation state. For each wheel, the tire-pressure control apparatus comprises up-time calculation means for calculating an up time, which is a time period over which the tire pressure of the wheel increases from the lower limit set value to the upper limit set value, on the basis of a detection value of the corresponding pressure sensor; down-time calculation means for calculating a down time, which is a time period over which the tire pressure of the wheel decreases from the upper limit set value to the lower limit set value, on the basis of the detection value of the pressure sensor; second-pump-supplied-air-quantity calculation means for calculating a second pump-supplied air quantity of the air pressure generation unit in a single generation and non-generation cycle on the basis of the up time and the down time; generation-state-maintaining-time calculation means for calculating a generation-state maintaining time, in which the air pressure generation unit is maintained in a generation state, on the basis of a detection value of the corresponding mode sensor; non-generation-state-maintaining-time calculation means for calculating a non-generation-state maintaining time, in which the air pressure generation unit is maintained in a non-generation state, on the basis of the detection value of the mode sensor; third-pump-supplied-air-quantity calculation means for calculating a third pump-supplied air quantity of the air pressure generation unit in a single generation and non-generation cycle on the basis of the generation-state maintaining time and the non-generation-state maintaining time; and determination means for comparing the second pump-supplied air quantity and the third pump-supplied air quantity. In this case, the results of the determination by the determination means may be reported to a driver by use of reporting means.

In this tire-pressure control apparatus, the second-pump-supplied-air-quantity calculation means calculates a second pump-supplied air quantity of the air pressure generation unit in a single generation and non-generation cycle, on the basis of the up time calculated on the basis of the detection value of the corresponding pressure sensor and the down time calculated on the basis of the detection value of the corresponding pressure sensor; and the third-pump-supplied-air-quantity calculation means calculates a third pump-supplied air quantity of the air pressure generation unit in a single generation and non-generation cycle, on the basis of the generation-state maintaining time calculated on the basis of the detection value of the corresponding mode sensor and the non-generation-state maintaining time calculated on the basis of the detection value of the mode sensor.

Incidentally, when the air pressure generation unit, the pressure sensor, and the mode sensor for a certain wheel are all normal, the second pump-supplied air quantity calculated by the second-pump-supplied-air-quantity calculation means for the wheel and the third pump-supplied air quantity calculated by the third-pump-supplied-air-quantity calculation means for the wheel must assume generally the same value.

Therefore, when the results of the determination by the determination means indicate that the difference between the second pump-supplied air quantity calculated by the second-pump-supplied-air-quantity calculation means and the third pump-supplied air quantity calculated by the third-pump-supplied-air-quantity calculation means is smaller than a set value, all the air pressure generation unit, the pressure sensor, and the mode sensor for the certain wheel are determined to be normal; and when the results of the determination by the determination means indicate that the difference between the second pump-supplied air quantity calculated by the second-pump-supplied-air-quantity calculation means and the third pump-supplied air quantity calculated by the third-pump-supplied-air-quantity calculation means is greater than the set value, the air pressure generation unit or the pressure sensor or the mode sensor for the certain wheel is determined to be anomalous. Accordingly, the reliability of the tire-pressure control apparatus can be improved.

BEST MODE FOR CARRYING OUT THE INVENTION

Figure 1:
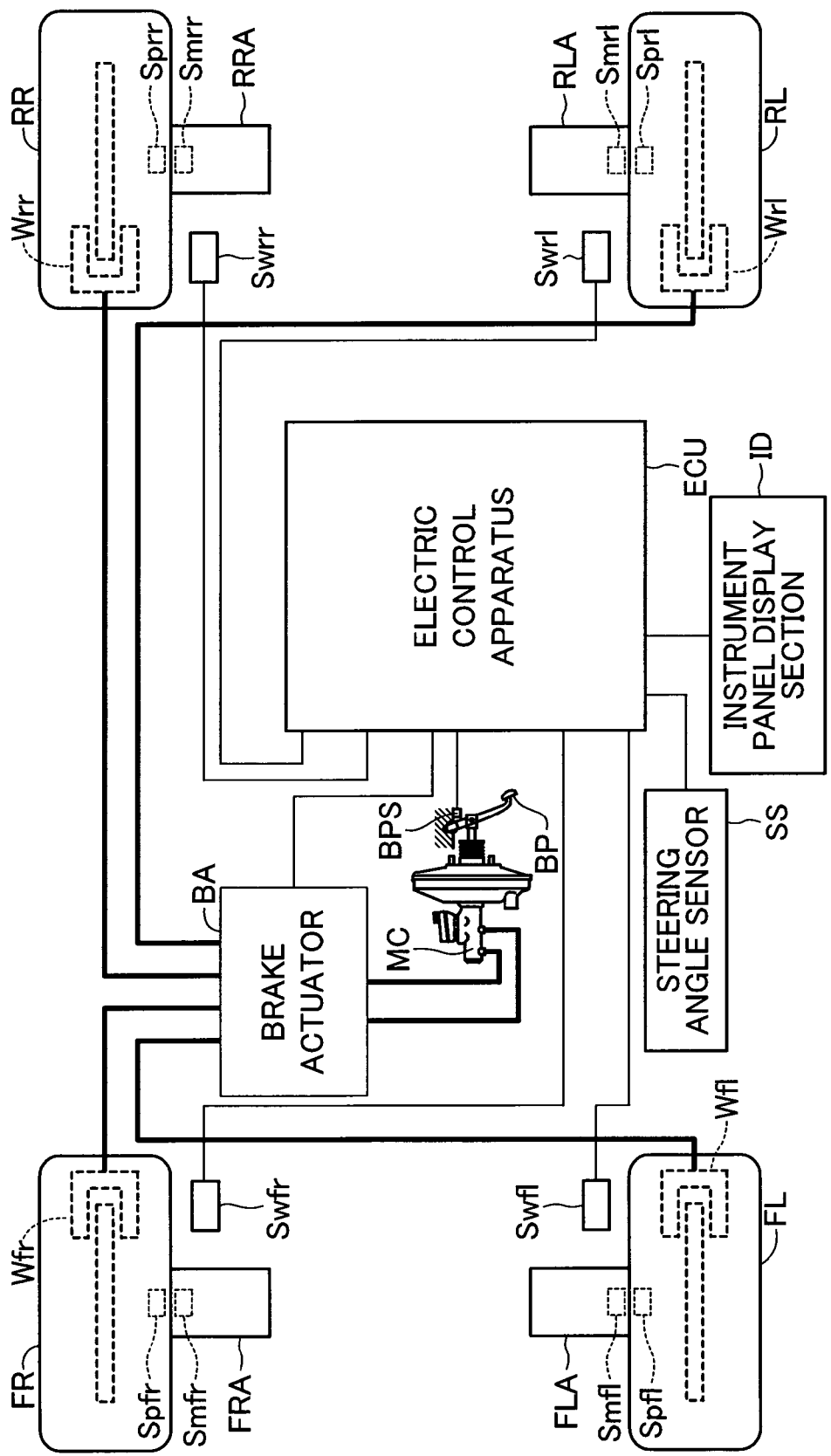
FIG. 1 is a block diagram schematically showing one embodiment of a four-wheeled vehicle equipped with a tire-pressure control apparatus according to the present invention.

An embodiment of the present invention will next be described with reference to the drawings. FIG. 1 schematically shows a four-wheeled vehicle equipped with a tire-pressure control apparatus according to the present invention. The tire-pressure control apparatus according to the present invention includes a pair of air pressure generating units FLA and FRA respectively provided for a front left wheel FL and a front right wheel FR, and a pair of air pressure generating units RLA and RRA respectively provided for a rear left wheel RL and a rear right wheel RR.

The tire-pressure control apparatus according to the present invention includes wheel speed sensors Swfl, Swfr, Swrl, and Swrr which respectively detect rotational speed Vfl of the wheel FL, rotational speed Vfr of the wheel FR, rotational speed Vrl of the wheel RL, and rotational speed Vrr of the wheel RR; pressure sensors Spfl, Spfr, Sprl, and Sprr which respectively detect tire pressure Pfl of the wheel FL, tire pressure Pfr of the wheel FR, tire pressure Prl of the wheel RL, and tire pressure Prr of the wheel RR; and mode sensors Smfl, Smfr, Smrl, and Smrr which each detect a compressed-air generation state and a compressed-air non-generation state of the air pressure generating unit FLA, FRA, RLA, or RRA. The wheel speed sensors Swfl, Swfr, Swrl, and Swrr are electrical connected to an electric control apparatus ECU by means of wires. The pressure sensors Spfl, Spfr, Sprl, and Sprr and the mode sensors Smfl, Smfr, Smrl, and Smrr are electrically connected to the electric control apparatus ECU by means of radio.

Figure 2:
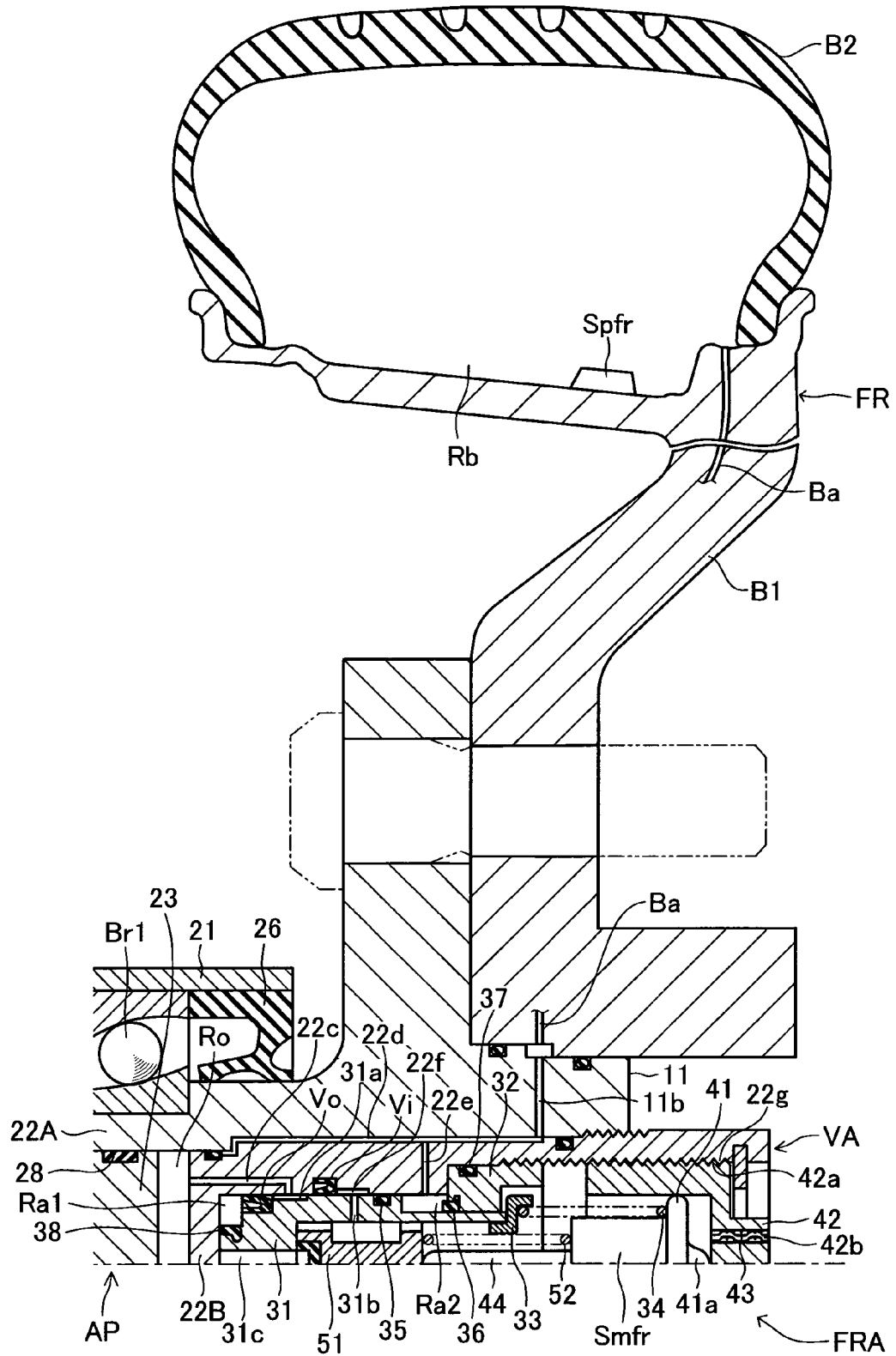
FIG. 2 is a detailed vertical sectional view of an air pressure generating unit provided for a front right wheel shown in FIG. 1.
Figure 3:
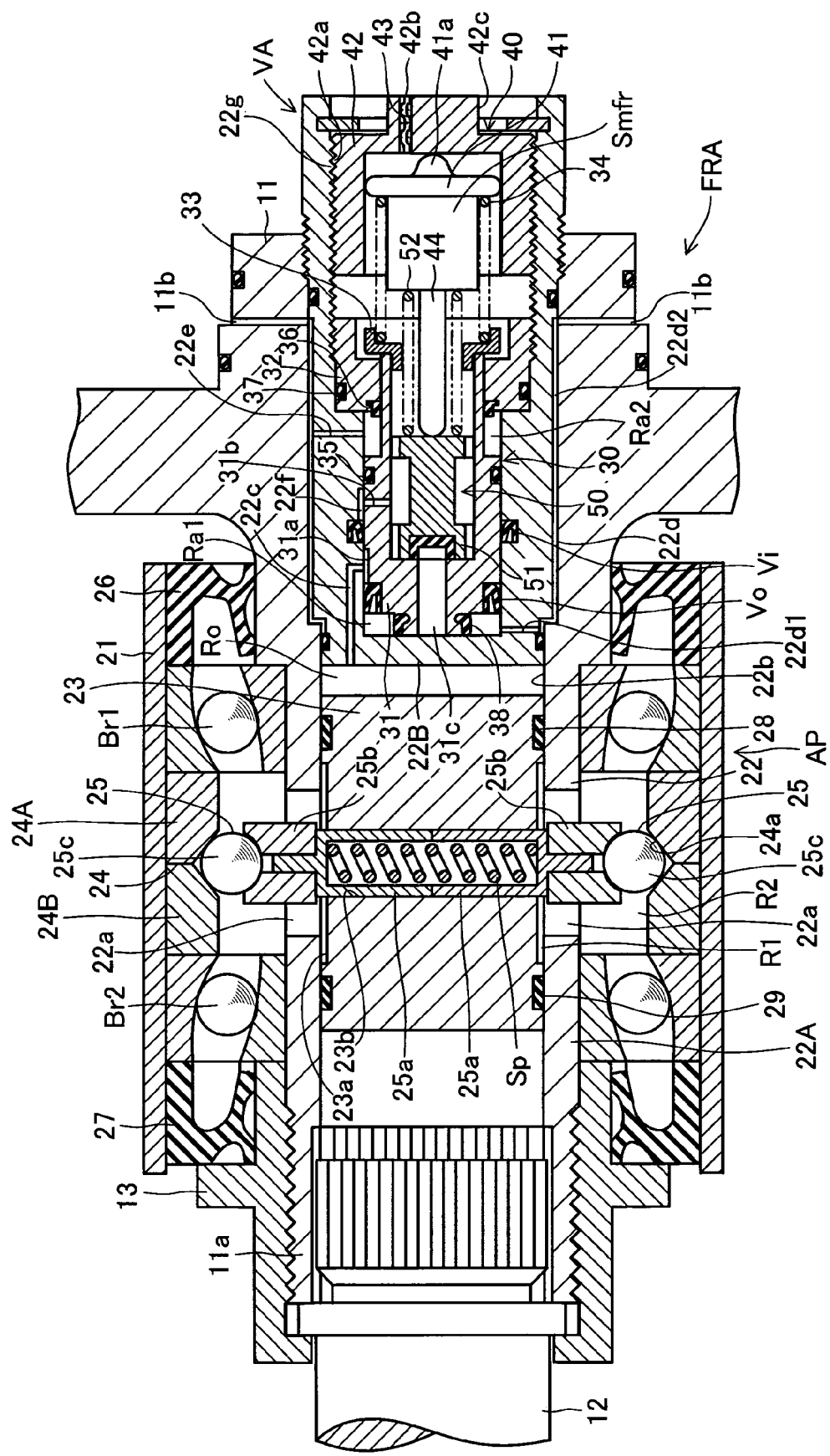
FIG. 3 is a sectional view of the entire air pressure generating unit shown in FIG. 2.

As shown in FIGS. 2 and 3, which illustrate the air pressure generating unit FRA installed on the front right wheel, the air pressure generating units FLA, FRA, RLA, and RRA can be driven by the rotations of the wheels FL, FR, RL, and RR, respectively. Each of the air pressure generating units FLA, FRA, RLA, and RRA includes an air pump AP, which can generate compressed air supplied to a tire air chamber Rb of the corresponding wheel FL, FR, RL, or RR; and a control valve device VA, which is interposed in an air circuit connecting the tire air chamber Rb and the air pump AP and controls communication among the tire air chamber Rb, the air pump AP, and the atmosphere. By virtue of this configuration, the tire pressures Pfl, Pfr, Prl, and Prr of the wheels FL, FR, RL, and RR can be maintained between a lower limit set value P1 and an upper limit set value P2 (P1<P2).

As shown in FIG. 2 illustrating the wheel FR as an example, the tire air chamber Rb of each wheel FL, FR, RL, RR is formed by a wheel body B1 and a tire B2. The pressure sensor Spfr is provided in the interior of the tire air chamber Rb in order to detect the tire pressure Pfr. Respective signals which are output from the pressure sensor Spfr provided for the wheel FR and the pressure sensors Spfl, Sprl, and Sprr respectively provided for the remaining wheels FL, RL, and RR and which respectively represent the tire pressures Pfl, Pfr, Prl, and Prr of the wheels FL, FR, RL, and RR are input to the electric control apparatus ECU shown in FIG. 1 by means of radio.

As shown in FIGS. 2 and 3, the air pump AP and the control valve device VA are attached to an axle hub 11 which rotates with the wheel FR. A driving axle 12 is splined to the inboard end of the axle hub 11, whereby the axle hub 11 and the driving axle 12 are connected for torque transmission. The connection between the axle hub 11 and the driving axle 12 is ensured by means of a lock nut 13.

The air pump AP (may be referred to as an air compressor) generates compressed air through adiabatic compression of atmospheric air. The air pump AP is driven as the wheel FR rotates, and is stopped as the wheel FR stops. The air pump AP can supply compressed air generated according to the rotation of the wheel FR, to the tire air chamber Rb of the wheel FR via a pressure control valve 30. The air pump AP includes a nonrotatable cylindrical member 21, a rotatable cylinder 22 formed on a shaft portion 11a of the axle hub 11, a piston 23 which can reciprocate, a cam member 24, and a pair of cam followers 25.

The cylindrical member 21 is supported nonrotatably by a support member (not shown). The cylinder 22 is supported in the interior of the cylindrical member 21 rotatably about the axis of the wheel FR and liquid-tightly via a pair of bearings Br1 and Br2 and a pair of annular seal members 26 and 27. The paired bearings Br1 and Br2 are spaced a predetermined distance apart from each other in the axial direction and intervene between the cylindrical member 21 and the cylinder 22 while sandwiching the cam member 24 therebetween in the axial direction, thereby enabling rotation of the cylinder 22 in relation to the cylindrical member 21. The paired annular seal members 26 and 27 are spaced a predetermined distance apart from each other in the axial direction and intervene between the cylindrical member 21 and the cylinder 22 while sandwiching the cam member 24 and the bearings Br1 and Br2 therebetween in the axial direction, thereby providing a liquid-tight seal between the cylindrical member 21 and the cylinder 22.

The cylinder 22 includes a cylinder body 22A and a cylinder head 22B, which is airtightly and removably screw-engaged with the outboard end portion of the cylinder body 22A. The cylinder body 22A is integrally formed on the shaft portion 11a of the axle hub 11, and includes a pair of axially elongated holes 22a and a cylinder bore 22b extending in the axial direction of the cylinder 22. The cylinder head 22B is a closed-bottomed tubular stopper member airtightly and removably attached to the axle hub 11, and includes a suction-discharge path 22c, a discharge path 22d, a pressure introduction path 22e, and a suction path 22f.

The paired axially elongated holes 22a collectively serve as a guide means for guiding the piston 23 and the cam followers 25 in such a manner that these members are rotatable unitarily with the cylinder 22 and can reciprocate in the axial direction of the piston 23. The paired axially elongated holes 22a are spaced 180 degrees apart from each other in the circumferential direction of the cylinder 22. The cylinder bore 22b accommodates the piston 23. The outboard end portion of the cylinder bore 22b is blocked by the cylinder head 22B. The cylinder bore 22b, in cooperation with the cylinder head 22B and the piston 23, forms a pump chamber Ro.

The suction-discharge path 22c always communicates with a communication path 31a provided in a valve body 31 of the pressure control valve 30. The suction-discharge path 22c can lead air into the pump chamber Ro through a suction check valve Vi (formed by an annular seal member having a V-shaped cross section) attached to the cylinder head 22B, and can lead air from the pump chamber Ro through a discharge check valve Vo (formed by an annular seal member having a V-shaped cross section) attached to the valve body 31 of the pressure control valve 30.

The discharge path 22d leads compressed air discharged into an air chamber Ra1 via the discharge check valve Vo, into a discharge path 11b provided in the axle hub 11. The discharge path 22d includes a communication hole 22d1 provided in the cylinder head 22B and extending in a radial direction thereof and a communication groove 22d2 provided on the outer circumference of the cylinder head 22B. As shown in FIG. 2, the discharge path 11b provided in the axle hub 11 communicates with the tire air chamber Rb through a communication path Ba provided in the wheel FR.

The pressure introduction path 22e is a communication hole provided in the cylinder head 22B and extending in a radial direction of the cylinder head. The pressure introduction path 22e is adapted to introduce the pressure of compressed air in the discharge path 22d into an air chamber Ra2 formed between the valve body 31 of the pressure control valve 30 and a stopper 32. The suction path 22f always communicates with an atmosphere communication path 31b provided in the valve body 31 of the pressure control valve 30. The communication between the suction path 22f and the communication path 31a provided in the valve body 31 of the pressure control valve 30 can be established and cut off. The atmosphere communication path 31b provided in the valve body 31 always communicates with the atmosphere through an atmosphere communication path 42b formed in an adjusting screw 42 of a regulator 40.

The piston 23 is inserted into the cylinder bore 22b of the cylinder 22 via a pair of annular seal members 28 and 29 and is attached to the cylinder 22 in a unitarily rotatable manner and in such a manner as to be able to axially reciprocate. The piston 23 has an annular groove 23a and a through hole 23b extending in a radial direction thereof. The paired annular seal members 28 and 29 are spaced a predetermined distance apart from each other in the axial direction of the piston 23 and intervene between the piston 23 and the cylinder 22 at respective, axial end portions of the piston 23, thereby providing an airtight, liquid-tight seal between the piston 23 and the cylinder 22.

The annular groove 23a is formed on the outer circumference of the piston 23 between the paired annular seal members 28 and 29, whereby an annular space R1 is formed between the piston 23 and the cylinder 22. The annular space R1 communicates with an annular space R2 formed between the paired annular seal members 26 and 27, through the axially elongated holes 22a formed in the cylinder 22. The annular spaces R1 and R2 remain unchanged in volume during axial reciprocating motion of the piston 23 and are sealed by means of the four seal members 26, 27, 28, and 29. The annular spaces R1 and R2 and the like collectively serve as an oil chamber for accommodating a predetermined amount of lubrication oil. This oil chamber accommodates the bearings Br1 and Br2, the cam member 24, the cam followers 25, a compression coil spring Sp, and the like.

The cam member 24 consists of a pair of cam sleeves 24A and 24B, which are provided in contact with each other in the axial direction of the piston 23, and is attached unitarily (in an axially immovable manner and in a nonrotatable manner) to the cylindrical member 21. The cam member 24 is disposed coaxially with the cylinder 22. The cam member 24 has an annular cam portion 24a whose axial position varies. The cam portion 24a is a cam groove, into which a ball 25c of each cam follower 25 is fitted. The cam portion 24a has a cam face which receives a load along the axial direction of the piston 23 (a load along the horizontal direction in FIG. 3) and a load along the radial direction of the piston 23 (a load along the vertical direction in FIG. 3) from the ball 25c of the cam follower 25. This cam face has a V-shaped cross section and has an even number of geometric cycles (e.g., two geometric cycles) along the circumferential direction of the cylinder 22.

The cam followers 25 each include a shaft 25a divided into two pieces within the piston 23, and a roller 25b and the ball 25c attached to the shaft 25a. The shaft 25a of each of the followers 25 is installed in the through hole 23b of the piston 23 in such a manner as to be movable in a radial direction of the piston 23. The cam followers 25 each are engaged with the cam portion (cam groove) 24a of the cam member 24, at the end portion extending in the piston radial direction (that is, at the ball 25c). Through relative rotation in relation to the cam member 24, the cam followers 25 can move in the axial direction of the piston 23.

The shafts 25a each serve as a load transmission element, which is installed in the through hole 23b of the piston 23 in such a manner as to be movable in the radial direction of the piston 23 (the axial direction of the through hole 23b). The compression coil spring Sp is installed within the shafts 25a and applies force to the shafts 25a in a radially outward direction of the piston 23. The shafts 25a are support bodies which rotatably support the rollers 25b. The rollers 25b are rotatably supported at respective small-diameter end portions projecting from the through hole 23b of the piston 23.

While being rotatably fitted to the respective small-diameter end portions of the shafts 25a, the rollers 25b are rollably fitted into the respective axially elongated holes 22a of the cylinder 22. The rollers 25b can roll along the respective axially elongated holes 22a of the cylinder 22 in association with the axial movement of the cam followers 25. Each of the rollers 25b has a hemispherically recessed bearing portion at its axially outer end. The bearing portions of the rollers 25b rollably support the respective balls 25c.

Each of the balls 25c is a protruded portion of the cam follower 25, which is rollably supported by the roller 25b and is rollably engaged with the cam portion (cam groove) 24a of the cam member 24. Each of the balls 25c is subject to repulsion force of the compression coil spring Sp via the shaft 25a and the roller 25b, and is resiliently engaged with the cam portion (cam groove) 24a of the cam member 24 without clearance.

The compression coil spring Sp is a pressing means for pressing the balls 25c of the cam followers 25 in a radial direction of the piston 23 toward the cam portion (cam groove) 24a of the cam member 24. The compression coil spring Sp is installed in closed-bottomed mounting holes of the shafts 25a of the cam followers 25 under predetermined preload.

In the thus-configured air pump AP, when the cylinder 22 (the axle hub 11) rotates with the valve body 31 of the pressure control valve 30 maintained in the position shown in FIGS. 2 and 3 (in a compressed-air generation state), the piston 23 and the cam followers 25 rotate unitarily with the cylinder 22 and undergo relative rotation in relation to the cam member 24 to thereby move axially. Accordingly, the rotary motion of the cylinder 22 can be converted to the reciprocating motion of the piston 23. The reciprocating motion of the piston 23 can increase and decrease the volume of the pump chamber Ro. Thus, air can be introduced into the pump chamber Ro through the atmosphere communication path 31b which always communicates with the atmosphere, the suction path 22f, the suction check valve Vi, the communication path 31a, and the suction-discharge path 22c. Also air can be discharged from the pump chamber Ro through the suction-discharge path 22c, the communication path 31a, and the discharge check valve Vo (that is, compressed air to be supplied into the tire air chamber Rb can be generated).

The control valve device VA mechanically operates in accordance with the tire pressure Pfr in the interior of the tire air chamber Rb, and includes the pressure control valve 30, the regulator 40, and a relief valve 50 which is coaxially disposed within the pressure control valve 30. The control valve device VA and the air pump AP are coaxially disposed in the shaft portion (rotation shaft) 11a of the axle hub 11.

The pressure control valve 30 is installed into the cylinder head 22B and includes the valve body 31, the stopper 32, and a compression coil spring 34. The compression coil spring 34 is engaged with the valve body 31 via a spring retainer 33 and can control moving timing and moving position of the valve body 31. Urging force (spring force) of the compression coil spring 34 which is applied to the valve body 31 can be adjusted by the regulator 40. When the tire pressure Pfr has decreased to a lower limit set value P1, the pressure control valve 30 changes its state from an operation state (a state where the valve body 31 has moved from the position shown in FIGS. 2 and 3 against urging forces of the compression spring 34 and a compression spring 52 by a predetermined distance) to a state shown in FIGS. 2 and 3, whereby compressed air can be supplied from the pump chamber Ro to the tire air chamber Rb. When the pressure of the compressed air (substantially equal to the tire pressure Pfr) supplied from the pump chamber Ro to the tire air chamber Rb increases to an upper limit set value P2, the pressure control valve 30 changes its state from the state shown in FIGS. 2 and 3 to the operation state, whereby the compressed air supplied from the pump chamber Ro to the tire air chamber Rb can be restricted (stopped).

The valve body 31 is airtightly installed in the cylinder head 22B via the discharge check valve Vo and an annular seal member 35, both attached to the outer circumference of the valve body, in such a manner as to be movable in the axial direction of the cylinder 22. The air chamber Ra1 which communicates with the discharge path 22d is formed between the valve body 31 and the cylinder head 22B. The air chamber Ra2 which communicates with the discharge path 22d via the pressure introduction path 22e is formed between the valve body 31 and the stopper 32. An annular seal member 36 is attached to the inner circumference of the stopper 32, and an annular seal member 37 is attached to the outer circumference of the stopper 32. The stopper 32 is airtightly interposed between the cylinder head 22B and the valve body 31 and is integrally screw-engaged with the cylinder head 22B at the outboard end portion of the outer circumference thereof.

The air chamber Ra1 always communicates with the tire air chamber Rb via the discharge path 22d, the discharge path 11b, and the communication path Ba. The air chamber Ra2 always communicates with the tire air chamber Rb via the pressure introduction path 22e, the discharge path 22d, the discharge path 11b, and the communication path Ba. A pressure-receiving area of the valve body 31 exposed to the air chamber Ra1 is set to be larger than that of the valve body 31 exposed to the air chamber Ra2 by a predetermined area.

In the pressure control valve 30, until the tire pressure Pfr increases to the upper limit set value P2 from the lower limit set value P1 to which the pressure has dropped, the valve body 31 is maintained at the position shown in FIGS. 2 and 3, and the communication between the communication path 31a and the suction path 22f is cut off by the suction check valve Vi. Thus, in the illustrated state, while the suction check valve Vi permits air flow from the atmosphere into the pump chamber Ro and the discharge check valve Vo permits air flow from the pump chamber Ro into the tire air chamber Rb, the suction check valve Vi cuts off the communication between the communication path 31a and the suction path 22f to thereby restrict air flow from the pump chamber Ro to the atmosphere, and the discharge check valve Vo restricts air flow from the tire air chamber Rb to the pump chamber Ro.

Therefore, in the above-described state (a permission state where the pressure control valve 30 permits compressed air to be supplied from the air pump AP to the tire air chamber Rb), the reciprocation of the piston 23 associated with the rotation of the wheel FR causes atmospheric air to be introduced into the pump chamber Ro and compressed air to be discharged from the pump chamber Ro to the tire air chamber Rb. This state is referred to as a "compressed-air generation state," in which the air pump AP generates compressed air, and a large load (rotational resistance acting on the wheel FR) is produced as a result of driving the air pump AP.

In the pressure control valve 30, during a period in which the tire pressure Pfr decreases to the lower limit set value P1 from the upper limit set value P2 to which the pressure has increased, the valve body 31 maintains its axial position shifted from the illustrated position by a predetermined amount, against the urging forces of the compression coil springs 34 and 52, so that the communication path 31a communicates with the suction path 22f irrespective of the presence of the suction check valve Vi. Therefore, the suction check valve Vi has lost its function (reverse-flow prevention function), whereby the communication path 31a communicates with the suction path 22f to thereby permit the air flow between the pump chamber Ro and the atmosphere. Furthermore, the discharge check valve Vo restricts air flow between the discharge path 22d and the communication path 31a; that is, between the pump chamber Ro and the tire air chamber Rb. In a state (an operation state) where the valve body 31 maintains its axial position shifted from the illustrated position by a predetermined amount against the urging forces of the compression coil springs 34 and 52, the shoulder portion of the valve body 31 is in contact with the annular seal member 36 attached to the inner circumference of the stopper 32.

Thus, in this state (a prohibition state where the pressure control valve 30 prohibits the supply of compressed air from the air pump AP to the tire air chamber Rb), even when the piston 23 reciprocates as a result of rotation of the wheel FR, air once introduced into the pump chamber Ro is pushed back to the atmosphere. Thus, no compressed air is discharged from the pump chamber Ro to the tire air chamber Rb. This state will be referred to as a "compressed-air non-generation state," in which the air pump AP does not generate compressed air, and a small load (rotational resistance acting on the wheel FR) is produced as a result of driving the air pump AP.

The regulator 40 includes a spring support 41 which supports the other end portion (a fixed end portion which does not move even when the valve body 31 moves) of the compression coil spring 34 of the pressure control valve 30; and the adjusting screw 42, which can adjust the position of the spring support 41. The spring support 41 can move as the adjusting screw 42 moves. A hemispherically protruded portion 41*a* of the spring support 41 is rotatably engaged with the adjusting screw 42.

The adjusting screw 42 is a separate member from the spring support 41, and includes a male thread portion 42*a* and the atmosphere communication path 42*b*. The male thread portion 42*a* of the adjusting screw 42 is screw-engaged with a female screw portion 22*g* of the cylinder head 22B in such a manner as to be able to advance and retreat. The adjusting screw 42 also serves as a cap, and can be rotated from the outside of the vehicle for adjustment. A hexagonal head portion 42*c* is formed on the outer end portion of the adjusting screw 42 such that a manually operable adjusting tool (not shown) can be removably attached thereto. A filter 43 is disposed in the atmosphere communication path 42*b*.

The relief valve 50 is adapted to release compressed air to the atmosphere when the pressure of compressed air supplied from the pump chamber Ro to the tire air chamber Rb; that is, the air pressure within the air chamber Ra1, is equal to or higher than a relief pressure P3 which is higher than the upper limit set value P2. The relief valve 50 includes a valve body 51 which can open and close a relief path 31*c* provided in the valve body 31; and the compression coil spring 52 whose one end portion (a movable end portion) is engaged with the valve body 51 and which determines the timing at which the valve body 51 moves (i.e., the timing at which the relief path 31*c* is opened).

The valve body 51 is installed in the valve body 31 of the pressure control valve 30 in such a manner as to be movable in the axial direction of the cylinder 22. The valve body 51 is in contact with a rod portion 44 of the mode sensor Smfr (the rod portion can undergo relative movement in the axial direction of the cylinder 22 with very little resistance when the position of the spring support 41 is adjusted by means of the adjusting screw 42). The other end portion (fixed end portion) of the compression coil spring 52 is engaged with the above-described spring support 41. The urging force of the compression coil spring 52 which acts on the valve body 51 can be adjusted by means of the regulator 40. At the time of adjustment by means of the regulator 40, the urging force of the compression coil spring 34 which acts on the valve body 31 of the pressure control valve 30 is also adjusted. Thus, the above-described upper limit set value P2 and relief pressure P3 can be adjusted simultaneously.

In the relief valve 50, the communication of the relief path 31*c* provided in the valve body 31 of the pressure control valve 30 with the air chamber Ra1 can be established and cut off by means of an annular seal member 38 attached to the valve body 31. Thus, only when the valve body 31 of the pressure control valve 30 moves against the urging force of the compression coil springs 34 and 52 and then the air chamber Ra1 communicates with the relief path 31*c* irrespective of presence of the seal member 38, the pressure within the air chamber Ra1 is introduced into the relief path 31*c*, whereby the relief valve 50 operates.

The mode sensor Smfr is an unit-state detection sensor for detecting whether the air pump AP is in a state where it generates compressed air (generation state) or in a state where it does not generate compressed air (non-generation state), by detecting the state of the pressure control valve 30; i.e., whether the pressure control valve 30 is in a permission state (illustrated state) or a prohibition state (operation state). The mode sensor Smfr includes the rod portion 44 which detects movement of the valve body 31 of the pressure control valve 30 via the valve body 51 of the relief valve 50; and an internal switch (not shown) which is provided in the spring support 41 and is turned ON and OFF by the rod portion 44.

In the mode sensor Smfr, when the pressure control valve 30 is in the permission state (when the air pump AP is in the compressed-air generation state), the internal switch is maintained in the OFF state, and outputs a Low signal; and when the pressure control valve 30 is in the prohibition state (when the air pump AP is in the compressed-air non-generation state), the internal switch is maintained in the ON state, and outputs a High signal. The signal output from the mode sensor Smfr is input by radio into the electric control apparatus ECU shown in FIG. 1.

As shown in FIG. 1, the electric control apparatus ECU is electrically connected to the wheel speed sensors Swfl, Swfr, Swrl, and Swrr; the pressure sensors Spfl, Spfr, Sprl and Sprr; and the mode sensors Smfl, Smfr, Smrl, and Smrr. Further, the electric control apparatus ECU is electrically connected to a steering angle sensor SS which detects steering angle and to a pedal switch BPS which operates in response to the depressing of a brake pedal BP.

Further, the electric control apparatus ECU is electrically connected to a known brake actuator BA which controls the operation of wheel brakes Wfl, Wfr, Wrl, and Wrr of an existing hydraulic brake apparatus mounted in a vehicle. Further, the electric control apparatus ECU is electrically connected to an instrument panel display section ID which can display whether the wheel speed sensors Swfl, Swfr, Swrl, and Swrr, the pressure sensors Spfl, Spfr, Sprl, and Sprr, and the mode sensors Smfl, Smfr, Smrl, and Smrr are "normal" or "anomalous."

Further, the electric control apparatus ECU includes a microcomputer which repeatedly performs a known program (not shown) at predetermined computation intervals (for example, 5 msec) in order to control braking hydraulic pressure applied to each of the wheel brakes Wfl, Wfr, Wrl, and Wrr by controlling the operation of the brake actuator BA in accordance with traveling conditions of the vehicle. The microcomputer also repeatedly performs programs corresponding to flowcharts shown in FIGS. 4 to 8 at predetermined computation intervals (for example, 5 msec) in accordance with outputs from the wheel speed sensors Swfl, Swfr, Swrl, and Swrr, the pressure sensors Spfl, Spfr, Sprl, and Sprr, the mode sensors Smfl, Smfr, Smrl, and Smrr, and the steering angle sensor SS. Thus, the electric control apparatus ECU can display on the instrument panel display section ID whether the wheel speed sensors Swfl, Swfr, Swrl, and Swrr, the pressure sensors Spfl, Spfr, Sprl, and Sprr, and the mode sensors Smfl, Smfr, Smrl, and Smrr are "normal" or "anomalous" in order to inform a driver of this information.

In the thus-configured embodiment, when an unillustrated main switch (e.g., an ignition switch) of the vehicle is in the ON state, the microcomputer in the electric control apparatus ECU repeatedly performs the known programs (not shown) for controlling braking hydraulic pressure; and the programs corresponding to the flowcharts shown in FIGS. 4 to 8 for determining whether the wheel speed sensors, the pressure sensors, the mode sensors, etc. are normal or anomalous, at predetermined computation intervals (for example, 5 msec). Therefore, the operation of the brake actuator BA is controlled in accordance with driving conditions of the vehicle, whereby known operations (e.g., ABS operation, brake assist operation, TRC operation) are provided. Detailed descriptions of the known operations (e.g., ABS operation, brake assist operation, TRC operation) are not repeated here.

Further, on the basis of outputs from the wheel speed sensors Swfl, Swfr, Swrl, and Swrr, the pressure sensors Spfl, Spfr, Sprl, and Sprr, the mode sensors Smfl, Smfr, Smrl, and Smrr, and the steering angle sensor SS, determinations are made as to whether each of the wheel speed sensors Swfl, Swfr, Swrl, and Swrr, the pressure sensors Spfl, Spfr, Sprl, and Sprr, and the mode sensors Smfl, Smfr, Smrl, and Smrr is "normal" or "anomalous." The obtained results are displayed on the instrument panel display section ID.

Figure 4:
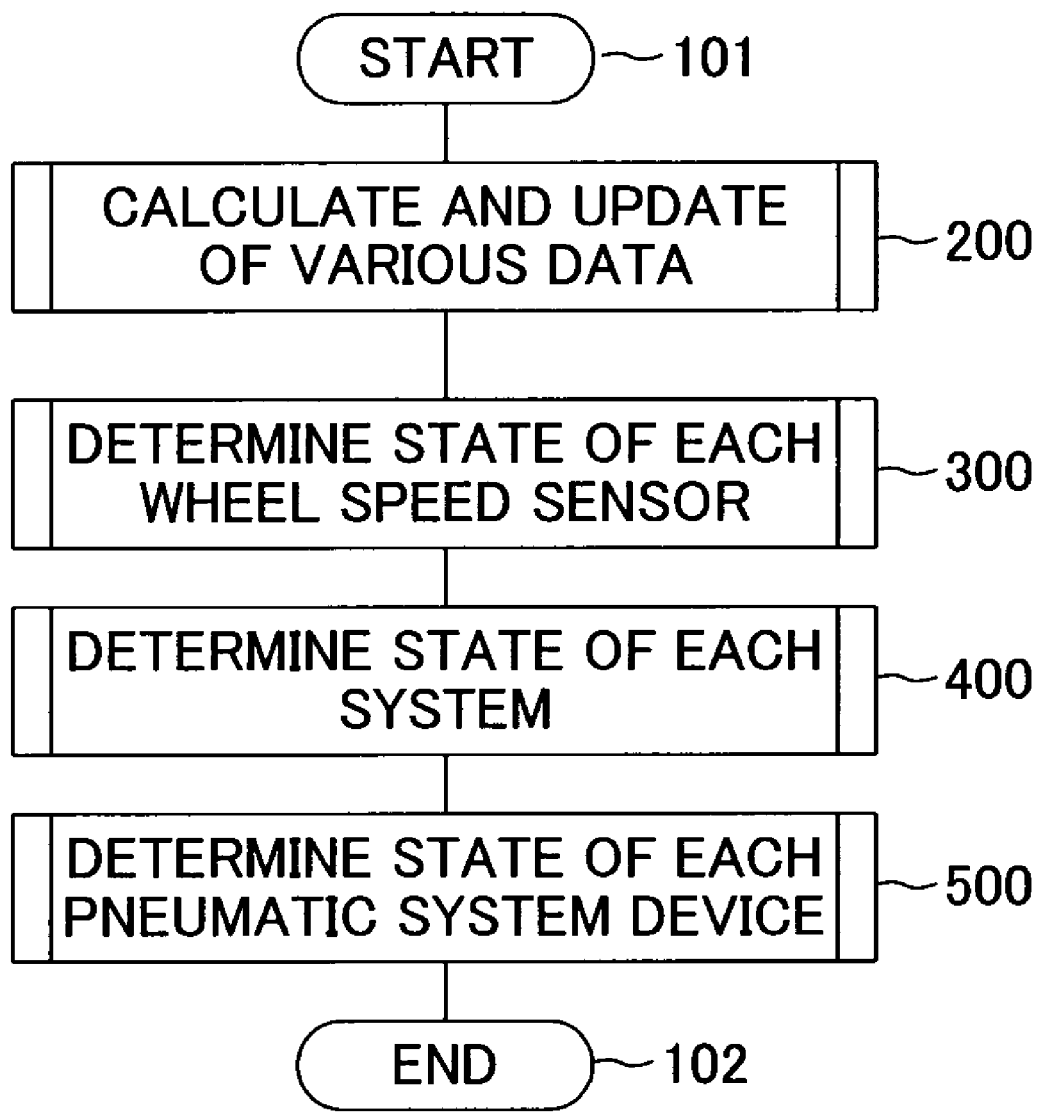
FIG. 4 is a flowchart showing a main routine which is executed by a microcomputer of an electric control apparatus shown in FIG. 1.

Incidentally, when performing the program (main routine) corresponding to the flowchart shown in FIG. 4, the microcomputer of the electric control apparatus ECU starts the processing from Step 101 of FIG. 4, and proceeds to Step 200 so as to calculate and update various data. Next, the microcomputer proceeds to Step 300 so as to determine the states of the wheel speed sensors, and then proceeds to Step 400 so as to determine the states of the systems. Subsequently, the microcomputer proceeds to Step 500 so as to determine the states of the pneumatic system devices, and then proceeds to Step 102 so as to end the current execution of the main routine.

Figure 5:
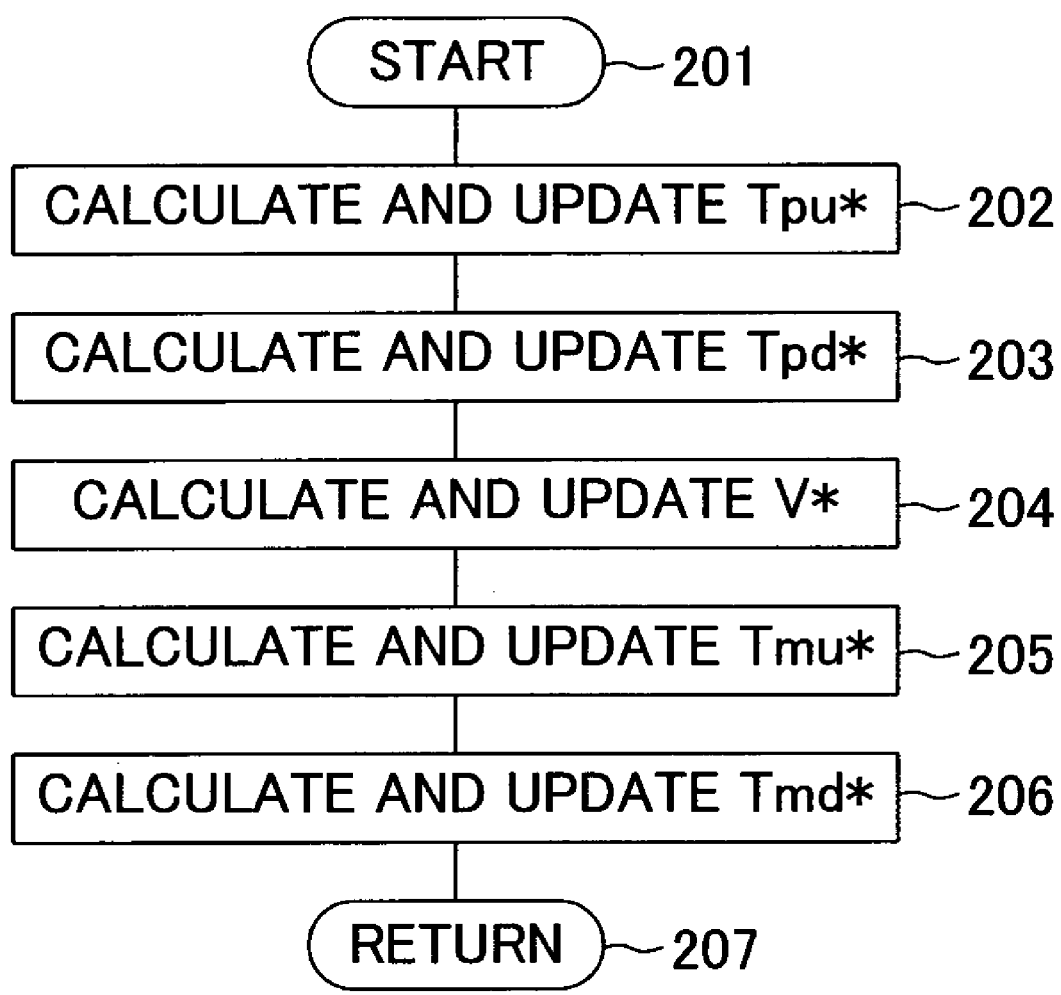
FIG. 5 is a flowchart showing a subroutine which is executed by the microcomputer in Step 200 of FIG. 4.

When calculating and updating the various data in Step 200 shown in FIG. 4, the microcomputer of the electric control apparatus ECU performs a subroutine shown in FIG. 5. In the subroutine shown in FIG. 5, the microcomputer starts the processing from Step 201, and proceeds to Step 202 so as to calculate and update up time Tpu* for each wheel (FL, FR, RL, RR). Next, the microcomputer proceeds to Step 203 so as to calculate and update down time Tpd* for each wheel (FL, FR, RL, RR), and proceeds to Step 204 so as to calculate and update average rotational speed V* of each wheel (FL, FR, RL, RR). The microcomputer then proceeds to Step 205 so as to calculate and update generation-state maintaining time Tmu* for each wheel (FL, FR, RL, RR), and proceeds to Step 206 so as to calculate and update non-generation-state maintaining time Tmd* for each wheel (FL, FR, RL, RR). Subsequently, the microcomputer proceeds to Step 207 and returns to the main routine shown in FIG. 4.

In Step 202 shown in FIG. 5, the microcomputer calculates and updates the up time Tpu* of each wheel; i.e., up time Tpufl of the front left wheel, which is a time period over which the tire pressure Pfl of the front left wheel FL increases from the lower limit set value P1 to the upper limit set value P2; up time Tpufr of the front right wheel, which is a time period over which the tire pressure Pfr of the front right wheel FR increases from the lower limit set value P1 to the upper limit set value P2; up time Tpurl of the rear left wheel, which is a time period over which the tire pressure Prl of the rear left wheel RL increases from the lower limit set value P1 to the upper limit set value P2; and up time Tpurr of the rear right wheel, which is a time period over which the tire pressure Prr of the rear right wheel RR increases from the lower limit set value P1 to the upper limit set value P2.

Figures 9A, 9B:
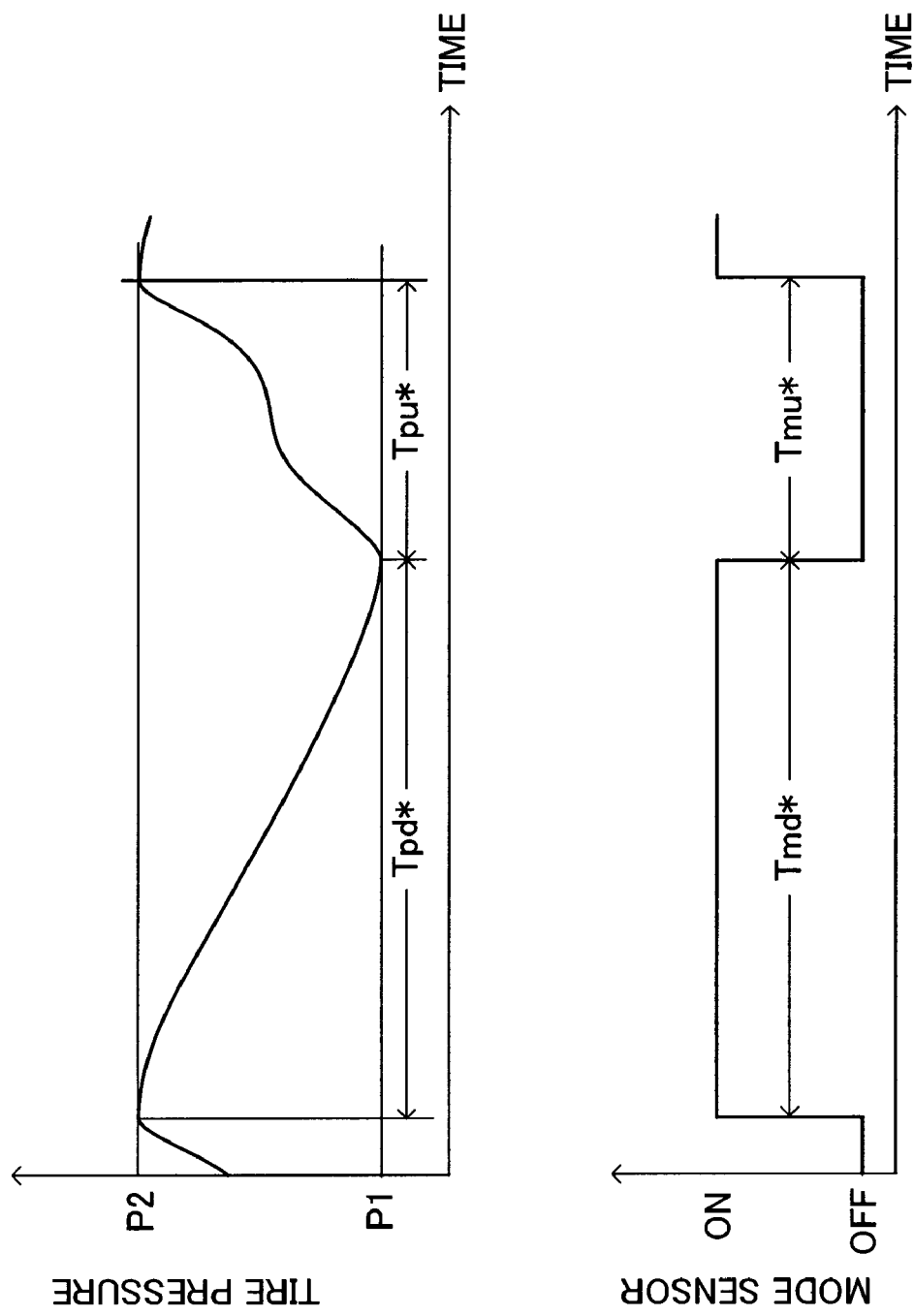
FIG. 9A is a diagram showing a relation between down time and up time.
FIG. 9B is a diagram showing a relation between generation-state maintaining time and non-generation-state maintaining time.

The above-described up time Tpu* (Tpufl, Tpufr, Tpurl, Tpurr) of each wheel is calculated (clocked) by making use of a counter. The counter starts a counting operation when the tire pressure P* (Pfl, Pfr, Prl, Prr) is determined to have decreased to the lower limit set value P1 on the basis of the output from the pressure sensor Spfl, Spfr, Sprl, Sprr, and stops the counting operation when the tire pressure P* (Pfl, Pfr, Prl, Prr) is determined to have increased to the upper limit set value P2 on the basis of the output from the pressure sensor Spfl, Spfr, Sprl, Sprr (see FIG. 9A). The up time Tpu* of each wheel is updated immediately after (or simultaneously with) the calculation. Therefore, the up time Tpu* of each wheel is maintained at the previous value until the tire pressure P* increases to the upper limit set value P2, and the up time Tpu* is updated to the current value when the tire pressure P* reaches the upper limit set value P2.

In Step 203 shown in FIG. 5, the microcomputer calculates and updates the down time Tpd* for each wheel; i.e., down time Tpdfl of the front left wheel, which is a time period over which the tire pressure Pfl of the front left wheel FL decreases from the upper limit set value P2 to the lower limit set value P1; down time Tpdfr of the front right wheel, which is a time period over which the tire pressure Pfr of the front right wheel FR decreases from the upper limit set value P2 to the lower limit set value P1; down time Tpdrl of the rear left wheel, which is a time period over which the tire pressure Prl of the rear left wheel RL decreases from the upper limit set value P2 to the lower limit set value P1; and down time Tpdrr of the rear right wheel, which is a time period over which the tire pressure Prr of the rear right wheel RR decreases from the upper limit set value P2 to the lower limit set value P1.

The above-described down time Tpd* (Tpdfl, Tpdfr, Tpdrl, Tpdrr) of each wheel is calculated (clocked) by making use of a counter. The counter starts a counting operation when the tire pressure P* (Pfl, Pfr, Prl, Prr) is determined to have increased to the upper limit set value P2 on the basis of the output from the pressure sensor Spfl, Spfr, Sprl, Sprr, and ends the counting operation when the tire pressure P* (Pfl, Pfr, Prl, Prr) is determined to have decreased to the lower limit set value P1 on the basis of the output from the pressure sensor Spfl, Spfr, Sprl, Sprr (see FIG. 9A). The down time Tpd* of each wheel is updated immediately after (or simultaneously with) the calculation. Therefore, the down time Tpd* of each wheel is maintained at the previous value until the tire pressure P* decreases to the lower limit set value P1, and the down time Tpd* is updated to the current value when the tire pressure P* reaches the lower limit set value P1.

In Step 204 shown in FIG. 5, the microcomputer calculates and updates the average rotational speed V* of each wheel; i.e., average rotational speed Vfl of the front left during a period over which the tire pressure Pfl of the front left wheel FL increases from the lower limit set value P1 to the upper limit set value P2; average rotational speed Vfr of the front right wheel during a period over which the tire pressure Pfr of the front right wheel FR increases from the lower limit set value P1 to the upper limit set value P2; average rotational speed Vrl of the rear left wheel during a period over which the tire pressure Prl of the rear left wheel RL increases from the lower limit set value P1 to the upper limit set value P2; and average rotational speed Vrr of the rear right wheel during a period over which the tire pressure Prr of the rear right wheel RR increases from the lower limit set value P1 to the upper limit set value P2.

The above-described average rotational speed V* (Vfl, Vfr, Vrl, Vrr) of each wheel is calculated as follows. The output value from the wheel speed sensor Swfl, Swfr, Swrl, Swrr (the output value corresponding to the rotational speed of each wheel) is calculated (cumulated) during a period over which the tire pressure P* (Pfl, Pfr, Prl, Prr) of the wheel is determined to increase from the lower limit set value P1 to the upper limit set value P2 on the basis of the output from the pressure sensor Spfl, Spfr, Sprl, Sprr; and the cumulated value is divided by the up time Tpu* immediately after (or simultaneously with) the calculation so as to calculate the average rotational speed V* (Vfl, Vfr, Vrl, Vrr) for update. Therefore, the average rotational speed V* of each wheel is maintained at the previous value until the tire pressure P* increases to the upper limit set value P2, and is updated to the current value when the tire pressure P* reaches the upper limit set value P2.

In Step 205 shown in FIG. 5, the microcomputer calculates and updates the generation-state maintaining time Tmu* of each wheel; that is, generation-state maintaining time Tmufl of the front left wheel, which is a time period starting when an air pressure generating unit FLA of the front left wheel FL starts the generation of compressed air and ending when the air pressure generating unit FLA stops the generation of compressed air; generation-state maintaining time Tmufr of the front right wheel, which is a time period starting when an air pressure generating unit FRA of the front right wheel FR starts the generation of compressed air and ending when the air pressure generating unit FRA stops the generation of compressed air; generation-state maintaining time Tmurl of the rear left wheel, which is a time period starting when an air pressure generating unit RLA of the rear left wheel RL starts the generation of compressed air and ending when the air pressure generating unit RLA stops the generation of compressed air; and generation-state maintaining time Tmurr of the rear right wheel, which is a time period starting when an air pressure generating unit RRA of the rear right wheel RR starts the generation of compressed air and ending when the air pressure generating unit RRA stops the generation of compressed air.

The above-described generation-state maintaining time Tmu* (Tmufl, Tmufr, Tmurl, Tmurr) of each wheel is calculated (clocked) by making use of a counter. The counter starts a counting operation when the air pressure generating unit (FLA, FRA, RLA, RRA) is determined to have started the generation of compressed air on the basis of the output from the mode sensor Smfl, Smfr, Smrl, Smrr (when the mode sensor is switched from the ON state to the OFF state), and stops the counting operation when the air pressure generating unit (FLA, FRA, RLA, RRA) is determined to have stopped the generation of compressed air on the basis of the output from the mode sensor Smfl, Smfr, Smrl, Smrr (when the mode sensor is switched from the OFF state to the ON state) (see FIG. 9B). The generation-state maintaining time Tmu* of each wheel is updated immediately after (or simultaneously with) the calculation. Therefore, the generation-state maintaining time Tmu* of each wheel is maintained at the previous value until the corresponding mode sensor is switched from the OFF state to the ON state, and updated to the current value when the mode sensor is switched from the OFF state to the ON state.

In Step 206 shown in FIG. 5, the microcomputer calculates and updates the non-generation-state maintaining time Tmd* for each wheel; that is, non-generation-state maintaining time Tmdfl of the front left wheel, which is a time period starting when the air pressure generating unit FLA of the front left wheel FL stops the generation of compressed air and ending when the air pressure generating unit FLA resumes the generation of compressed air; non-generation-state maintaining time Tmdfr of the front right wheel, which is a time period starting when the air pressure generating unit FRA of the front right wheel FR stops the generation of compressed air and ending when the air pressure generating unit FRA resumes the generation of compressed air; non-generation-state maintaining time Tmdrl of the rear left wheel, which is a time period starting when the air pressure generating unit RLA of the rear left wheel RL stops the generation of compressed air and ending when the air pressure generating unit RLA resumes the generation of compressed air; and non-generation-state maintaining time Tmdrr of the rear right wheel, which is a time period starting when the air pressure generating unit RRA of the rear right wheel RR stops the generation of compressed air and ending when the air pressure generating unit RRA resumes the generation of compressed air.

The above-described non-generation-state maintaining time Tmd* (Tmdfl, Tmdfr, Tmdrl, Tmdrr) of each wheel is calculated (clocked) by making use of a counter. The counter starts a counting operation when the air pressure generating unit (FLA, FRA, RLA, RRA) is determined to have stopped the generation of compressed air on the basis of the output from the mode sensor Smfl, Smfr, Smrl, Smrr (when the mode sensor is switched from the OFF state to the ON state), and stops the counting operation when the air pressure generating unit (FLA, FRA, RLA, RRA) is determined to have started the generation of compressed air on the basis of the output from the mode sensor Smfl, Smfr, Smrl, Smrr (when the mode sensor is switched from the ON state to the OFF state) (see FIG. 9B). The non-generation-state maintaining time Tmd* of each wheel is updated immediately after (or simultaneously with) the calculation. Therefore, the non-generation-state maintaining time Tmd* of each wheel is maintained at the previous value until the corresponding mode sensor is switched from the ON state to the OFF state, and updated to the current value when the mode sensor is switched from the ON state to the OFF state.

Figure 6:
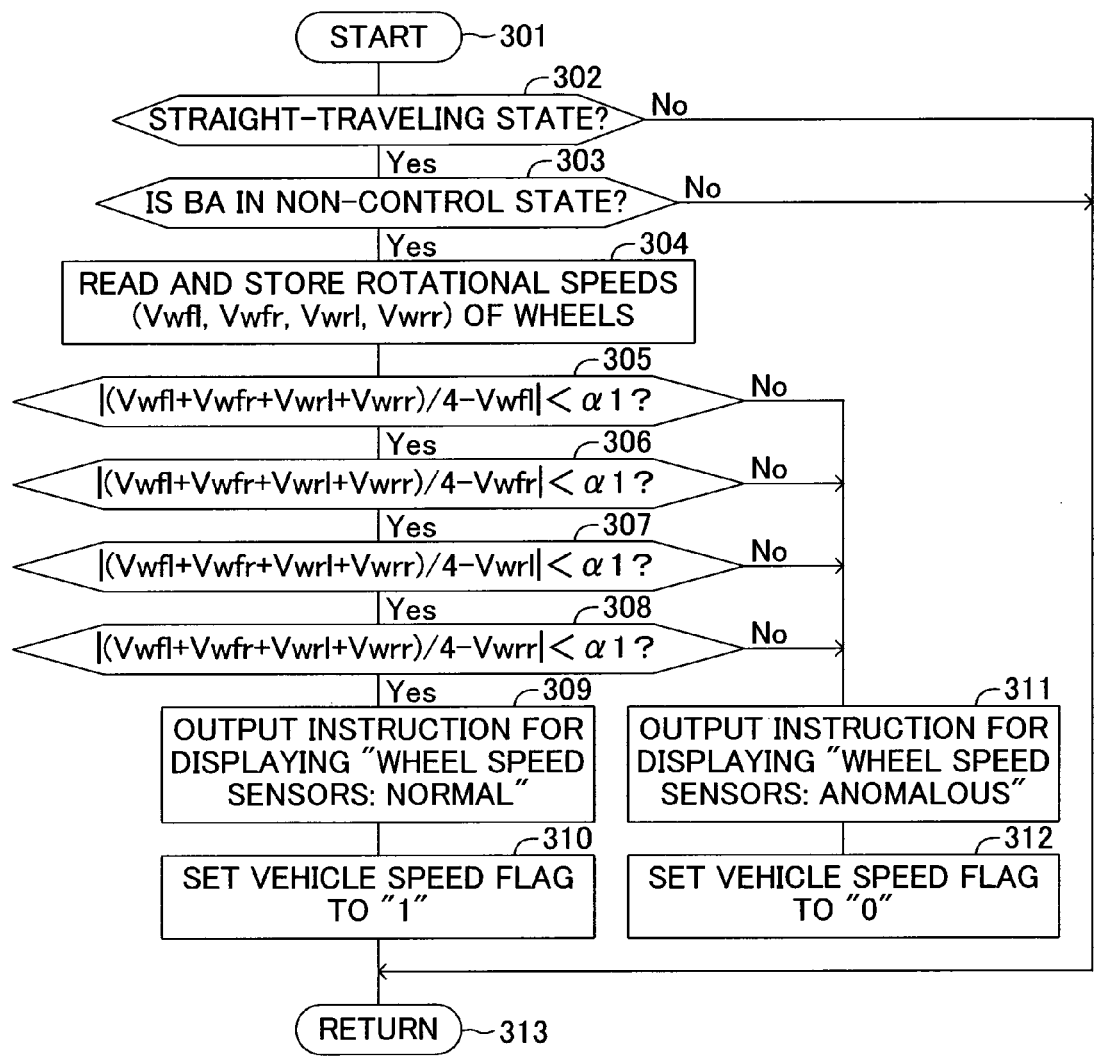
FIG. 6 is a flowchart showing a subroutine which is executed by the microcomputer in Step 300 of FIG. 4.

Further, when determining the states of the wheel speed sensors in Step 300 shown in FIG. 4, the microcomputer of the electric control apparatus ECU performs a subroutine shown in FIG. 6. In the subroutine shown in FIG. 6, the microcomputer of the electric control apparatus ECU starts the processing from Step 301, and proceeds to Step 302 so as to determine whether the vehicle is in a straight-traveling state or not. Subsequently, the microcomputer proceeds to Step 303 so as to determine whether or not the brake actuator BA is in a non-control state (for example, none of ABS operation, brake assist operation, TRC operation, etc. is not performed), and proceeds to Step 304 so as to read and store the rotational speed (Vwfl, Vwfr, Vwrl, Vwrr) of each wheel.

Further, the microcomputer of the electric control apparatus ECU proceeds to Steps 305 to 308 so as to determine whether the wheel speed sensors Swfl, Swfr, Swrl, and Swrr are normal or anomalous. If the wheel speed sensors Swfl, Swfr, Swrl, and Swrr are all normal, the microcomputer proceeds to Step 309 so as to output an instruction for displaying a message "Wheel Speed Sensors; Normal," and proceeds to Step 310 so as to set a vehicle speed flag to "1." If any of the wheel speed sensors Swfl, Swfr, Swrl, and Swrr is determined to be anomalous, the microcomputer proceeds to Step 311 so as to output an instruction for displaying a message "Wheel Speed Sensors: Anomalous," and proceeds to Step 312 so as to set the vehicle speed flag to "0." Subsequently, the microcomputer proceeds to Step 313 so as to return to the main routine shown in FIG. 4.

Therefore, if the vehicle is in the straight-traveling state and the brake actuator BA is in the non-control state, the microcomputer of the electric control apparatus ECU makes a "Yes" determination on the basis of the output from the steering angle sensor SS in Step 302, and then makes a "Yes" determination on the basis of the set value of a braking control flag (not shown) in Step 303. The microcomputer then performs processing of Steps 304 to 313. If the vehicle is not in the straight-traveling state, the microcomputer makes a "No" determination in Step 302 and then performs Step 313. Therefore, if the brake actuator BA is in the control state (for example, any of ABS operation, brake assist operation, TRC operation, etc. is being performed), the microcomputer makes a "No" determination in Step 303, and then performs Step 313.

In Step 305 shown in FIG. 6, the microcomputer calculates the difference between the rotational speed Vwfl detected by the wheel speed sensor Swfl and the average (Vwfl+Vwfr+Vwrl+Vwrr)/4 of the rotational speeds of the wheels detected by the wheel speed sensors Swfl, Swfr, Swrl, and Swrr, and then determines whether the difference is less than a preset value $\alpha 1$. When the microcomputer makes a "Yes" determination (i.e., determines that the wheel speed sensor Swfl is normal), it performs Step 306. When the microcomputer makes a "No" determination (i.e., determines that the wheel speed sensor Swfl is anomalous), it performs Step 311.

In Step 306 shown in FIG. 6, the microcomputer calculates the difference between the rotational speed Vwfr detected by the wheel speed sensor Swfr and the average (Vwfl+Vwfr+Vwrl+Vwrr)/4 of the rotational speeds of the wheels detected by the wheel speed sensors Swfl, Swfr, Swrl, and Swrr, and then determines whether the difference is less than the preset value α1. When the microcomputer makes a "Yes" determination (i.e., determines that the wheel speed sensor Swfr is normal), it performs Step 307. When the microcomputer makes a "No" determination (i.e., determines that the wheel speed sensor Swfr is anomalous), it performs Step 311.

In Step 307 shown in FIG. 6, the microcomputer calculates the difference between the rotational speed Vwrl detected by the wheel speed sensor Swrl and the average (Vwfl+Vwfr+Vwrl+Vwrr)/4 of the rotational speeds of the wheels detected by the wheel speed sensors Swfl, Swfr, Swrl, and Swrr, and then determines whether the difference is less than the preset value α1. When the microcomputer makes a "Yes" determination (i.e., determines that the wheel speed sensor Swrl is normal), it performs Step 308. When the microcomputer makes a "No" determination (i.e., determines that the wheel speed sensor Swrl is anomalous), it performs Step 311.

In Step 308 shown in FIG. 6, The microcomputer calculate the difference between the rotational speed Vwrr detected by the wheel speed sensor Swrr and the average (Vwfl+Vwfr+Vwrl+Vwrr)/4 of the rotational speeds of the wheels detected by the wheel speed sensors Swfl, Swfr, Swrl, and Swrr, and then determines whether the difference is less than the preset value α1. When the microcomputer makes a "Yes" determination (i.e., determines that the wheel speed sensor Swrr is normal), it performs Step 309. When the microcomputer makes a "No" determination (i.e., determines that the wheel speed sensor Swrr is anomalous), it performs Step 311.

Further, in Step 309 of FIG. 6, the microcomputer outputs an instruction for displaying a message "Wheel Speed Sensors: Normal," whereby the message "Wheel Speed Sensors: Normal" is displayed on the instrument panel display section ID. In Step 311 of FIG. 6, the microcomputer outputs an instruction for displaying a message "Wheel Speed Sensors Anomalous," whereby the message "Wheel Speed Sensors: Anomalous" is displayed on the instrument panel display section ID. From these messages displayed on the instrument panel display section ID, the driver can recognize whether the wheel speed sensors Swfl, Swfr, Swrl, and Swrr are all normal or at least one of them is anomalous.

Figure 7:
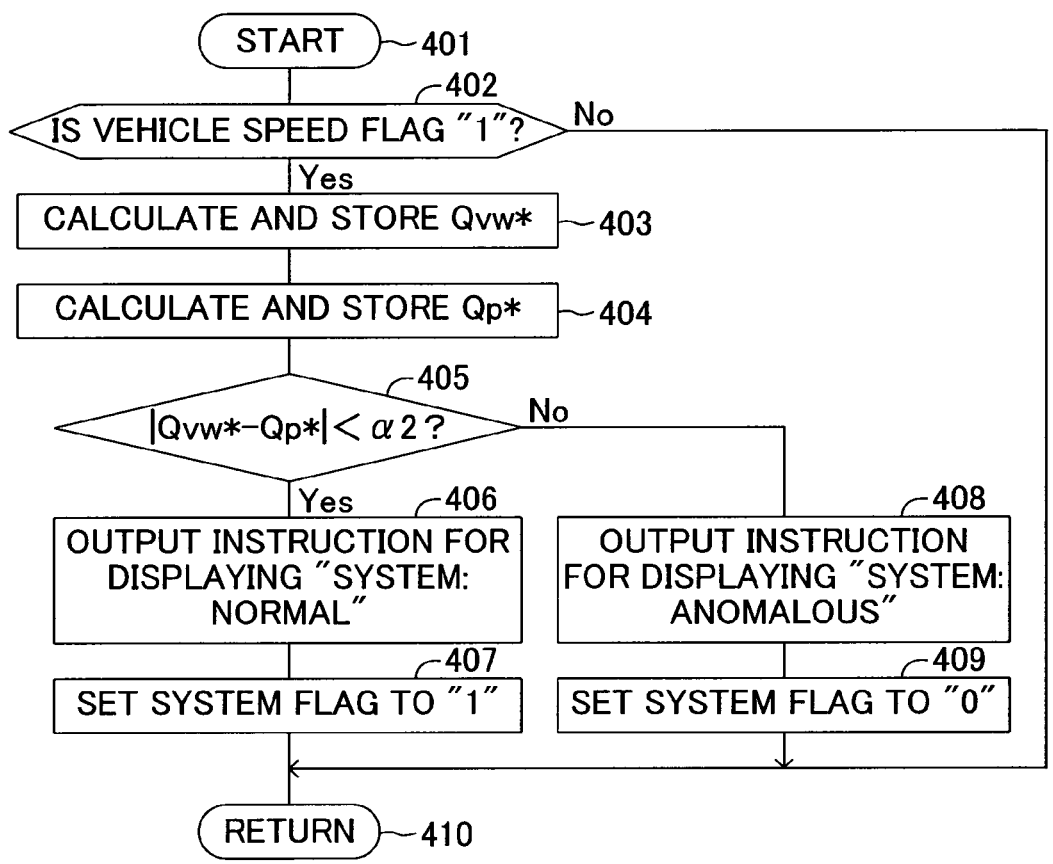
FIG. 7 is a flowchart showing a subroutine which is executed by the microcomputer in Step 400 of FIG. 4.

Further, when determining a state of each system in Step 400 shown in FIG. 4, the microcomputer of the electric control apparatus ECU performs a subroutine shown in FIG. 7. In the subroutine shown in FIG. 7, the microcomputer of the electric control apparatus ECU starts the processing from Step 401, and proceeds to Step 402 so as to determine whether or not the vehicle speed flag is set to "1." The microcomputer then calculates and stores first pump-supplied air quantity Qvw* of each wheel in Step 403, and proceeds to Step 404 so as to calculate and store second pump-supplied air quantity Qp* of each wheel.

Further, in Step 405, the microcomputer of the electric control apparatus ECU determines whether or not the difference between the first pump-supplied air quantity Qvw* of a wheel and the second pump-supplied air quantity Qp* of the wheel is less than a preset value α2. The microcomputer outputs an instruction for displaying a message "System: Normal" in Step 406, and proceeds to Step 407 so as to set a system flag to "1." The microcomputer outputs an instruction for displaying a message "System: Anomalous" in Step 408, and proceeds to Step 409 so as to set the system flag to "0." The microcomputer then proceeds to Step 410 so as to return to the main routine shown in FIG. 4.

In the subroutine shown in FIG. 7, Steps 403 to 409 is repeatedly executed for each wheel (FL, FR, RL, RR). Thus, Steps 403 to 409 is performed for the wheel FL, for the wheel FR, then for the wheel RL, and finally for the wheel RR.

Therefore, if the vehicle speed flag has been set to "1" before execution of Step 402, the microcomputer of the electric control apparatus ECU makes a "Yes" determination in Step 402, and performs Steps 403 to 409 for each wheel (FL, FR, RL, RR) successively. Meanwhile, if the vehicle speed flag has been set to "0" before execution of Step 402, the microcomputer of the electric control apparatus ECU makes a "No" determination in Step 402, and performs Step 410.

Further, if the difference between the first pump-supplied air quantity Qvw* of a wheel and the second pump-supplied air quantity Qp* of the wheel is less than the preset value α2 at the time of execution of Step 405, the microcomputer of the electric control apparatus ECU makes a "Yes" determination in Step 405, and performs Steps 406 and 407 successively. Meanwhile, if the difference between the first pump-supplied air quantity Qvw* of a wheel and the second pump-supplied air quantity Qp* of the wheel is more than the preset value α2 at the time of execution of Step 405, the microcomputer of the electric control apparatus ECU makes a "No" determination in Step 405, and performs Steps 408 and 409 successively.

Incidentally, in Step 403 shown in FIG. 7, the microcomputer calculates and stores the first pump-supplied air quantity Qvw* of each wheel; that is, first pump-supplied air quantity Qvwfl, which is the quantity of air that the air pressure generating unit FLA (the air pump AP) provided at the front left wheel FL supplies to the tire air chamber Rb during a single generation and non-generation cycle; first pump-supplied air quantity Qvwfr, which is the quantity of air that the air pressure generating unit FRA (the air pump AP) provided at the front right wheel FR supplies to the tire air chamber Rb during a single generation and non-generation cycle; first pump-supplied air quantity Qvwrl, which is the quantity of air that the air pressure generating unit RLA (the air pump AP) provided at the rear left wheel RL supplies to the tire air chamber Rb during a single generation and non-generation cycle; and first pump-supplied air quantity Qvwrr, which is the quantity of air that the air pressure generating unit RRA (the air pump AP) provided at the rear right wheel RR supplies to the tire air chamber Rb during a single generation and non-generation cycle.

The first pump-supplied air quantity Qvw* (Qvwfl, Qvwfr, Qvwrl, Qvwrr) of each wheel is calculated on the basis of the up time Tpu* (Tpufl, Tpufr, Tpurl, Tpurr) of each wheel calculated and updated in the above described Step 202 and the average rotational speed V* (Vfl, Vfr, Vrl, Vrr) of each wheel calculated and updated in the above described Step 204. Notably, the up time Tpu* of each wheel corresponds to drive time of the air pump AP which is rotated by the axle hub 11 of each wheel. The average rotational speed V* corresponds to the number of revolutions per unit time of the air pump AP. Thus, the first pump-supplied air quantity Qvw* of each wheel is calculated by multiplying the product of the up time Tpu* and the average rotational speed V* by a coefficient corresponding to the pump efficiency.

Further, in Step 404 shown in FIG. 7, the microcomputer calculates and stores the second pump-supplied air quantity Qp* of each wheel; that is, second pump-supplied air quantity Qpfl, which is the quantity of air that the air pressure generating unit FLA (the air pump AP) provided at the front left wheel FL supplies to the tire air chamber Rb during a single generation and non-generation cycle; second pump-supplied air quantity Qpfr, which is the quantity of air that the air pressure generating unit FRA (the air pump AP) provided at the front right wheel FR supplies to the tire air chamber Rb during a single generation and non-generation cycle; second pump-supplied air quantity Qprl, which is the quantity of air that the air pressure generating unit RLA (the air pump AP) provided at the rear left wheel RL supplies to the tire air chamber Rb during a single generation and non-generation cycle; and second pump-supplied air quantity Qprr, which is the quantity of air that the air pressure generating unit RRA (the air pump AP) provided at the rear right wheel RR supplies to the tire air chamber Rb during a single generation and non-generation cycle.

The second pump-supplied air quantity Qp* (Qpfl, Qpfr, Qprl, Qprr) of each wheel is calculated on the basis of the up time Tpu* (Tpufl, Tpufr, Tpurl, Tpurr) of each wheel, which is calculated and updated in the above described Step 202, and the down time Tpd* (Tpdfl, Tpfr, Tprl, Tprr) of each wheel, which is calculated and updated in the above described Step 203.

The up time Tpu* of each wheel is a time period over which the tire pressure P* of each wheel increases from the lower limit set value P1 to the upper limit set value P2 as a result of the air pump AP being rotated by the axle hub 11 of each wheel. The down time Tpd* of each wheel is a time period over which the tire pressure P* of each wheel decreases from the upper limit set value P2 to the lower limit set value P1 with the air pump AP not rotated.

The second pump-supplied air quantity Qp* is calculated as follows. The quantity of air leakage per unit time (Q1/Tpd*) is calculated from the total quantity of air leakage Q1 during the down time Tpd* of each wheel (the quantity of air leakage in a time period over which the tire pressure P* of each wheel decreases from the upper limit set value P2 to the lower limit set value P1), the total quantity of air leakage Q1 being approximately obtained from the state equation (P·Vm=M·R·T) of gas in the pneumatic system including the tire air chamber Rb of each wheel. The total quantity of air leakage Q1 is added to the product of the quantity of air leakage per unit time (Q1/Tpd*) and the up time Tpu* (i.e., the quantity of air leakage during the up time Tpu*) so as to calculate the second pump-supplied air quantity Qp*.

In the above-described state equation of gas (P·Vm=M·R·T), P is the absolute pressure in the pneumatic system; Vm is the volume of the pneumatic system; M is the weight of residual air in the pneumatic system; R is the gas constant of air; and T is the absolute temperature in the pneumatic system. The values other than P and M are assumed to have been approximately obtained in advance and not to vary (that is, they are constants). Therefore, the total quantity of air leakage Q1 is approximately calculated as follows. The weight M1 of residual air in the pneumatic system at the time when the tire pressure P* is at the lower limit set value P1 is subtracted from the weight M2 of residual air in the pneumatic system at the time when the tire pressure P* is at the upper limit set value P2 so as to obtain an air weight (M2-M1), and the air weight (M2-M1) is converted to a corresponding volume, whereby the total quantity of air leakage Q1 is approximately calculated.

Further, in Step 406 of FIG. 7, the microcomputer outputs an instruction for displaying a message "System: Normal," whereby the message "System: Normal" is displayed on the instrument panel display section ID. In Step 408, the microcomputer outputs an instruction for displaying a message "System: Anomalous," whereby the message "System: Anomalous" is displayed on the instrument panel display section ID. From these messages displayed on the instrument panel display section ID, the driver can recognize whether the air pumps and the pressure sensors provided in the air pressure generating units of the wheels are normal or whether at least one of them is anomalous.

Figure 8:
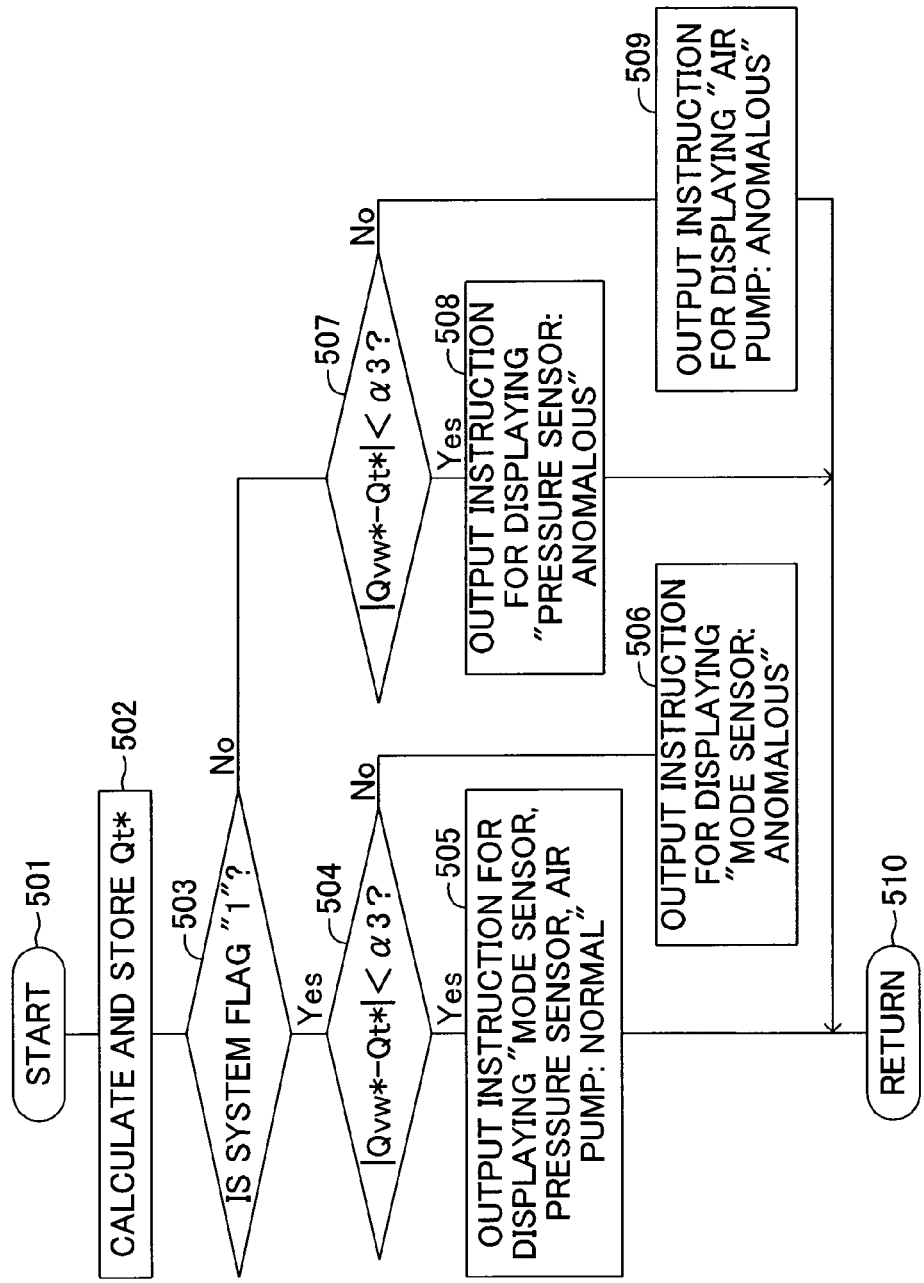
FIG. 8 is a flowchart showing a subroutine which is executed by the microcomputer in Step 500 of FIG. 4.

Further, when determining the states of the pneumatic system devices in Step 500 shown in FIG. 4, the microcomputer of the electric control apparatus ECU performs a subroutine shown in FIG. 8. In the subroutine shown in FIG. 8, the microcomputer of the electric control apparatus ECU starts the processing from Step 501, and proceeds to Step 502 so as to calculate and store third pump-supplied air quantity Qt* of each wheel. The microcomputer then proceeds to Step 503 so as to determine whether the system flag is set to "1."

Further, in Step 504, the microcomputer of the electric control apparatus ECU determines whether or not the difference between the first pump-supplied air quantity Qvw* of a wheel and the third pump-supplied air quantity Qt* of the wheel is less than a preset value $\alpha 3$. The microcomputer outputs an instruction for displaying a message "Mode Sensor, Pressure Sensor, Air Pump: Normal" in Step 505, and outputs an instruction for displaying a message "Mode Sensor: Anomalous" in Step 506. In Step 510, the microcomputer returns to the main routine shown in FIG. 4. Further, in Step 507, the microcomputer of the electric control apparatus ECU determines whether or not the difference between the first pump-supplied air quantity Qvw* of a wheel and the third pump-supplied air quantity Qt* of the wheel is less than the preset value $\alpha 3$. The microcomputer outputs an instruction for displaying a message "Pressure Sensor: Anomalous" in Step 508, and outputs an instruction for displaying a message "Air Pump: Anomalous" in Step 509.

In the subroutine shown in FIG. 8, processing of Steps 502 to 509 is repeatedly executed for each wheel (FL, FR, RL, RR). Therefore, Steps 502 to 509 are performed for the wheel FL, for the wheel FR, then for the wheel RL, and finally for the wheel RR.

Therefore, if the system flag has been set to "1" before execution of Step 503, the microcomputer of the electric control apparatus ECU makes a "Yes" determination in Step 503, and then performs Step 504. Meanwhile, if the system flag is set to "0" before execution of Step 503, the microcomputer of the electric control apparatus ECU makes a "No" determination in Step 503, and then performs Step 507.

Further, if the difference between the first pump-supplied air quantity Qvw* of a wheel and the third pump-supplied air quantity Qt* of the wheel is less than the preset value $\alpha 3$ at the time of execution of Step 504, the microcomputer of the electric control apparatus ECU makes a "Yes" determination in Step 504, and then performs Step 505. Meanwhile, if the difference between the first pump-supplied air quantity Qvw* of a wheel and the third pump-supplied air quantity Qt* of the wheel is more than the preset value $\alpha 3$ at the time of execution of Step 504, the microcomputer of the electric control apparatus ECU makes a "No" determination in Step 504, and then performs Step 506.

Further, if the difference between the first pump-supplied air quantity Qvw* of a wheel and the third pump-supplied air quantity Qt* of the wheel is less than the preset value $\alpha 3$ at the time of execution of Step 507, the microcomputer of the electric control apparatus ECU makes a "Yes" determination in Step 507, and then performs Step 508. Meanwhile, if the difference between the first pump-supplied air quantity Qvw* of a wheel and the third pump-supplied air quantity Qt* of the wheel is more than the preset value $\alpha 3$ at the time of execution of Step 507, the microcomputer of the electric control apparatus ECU makes a "No" determination in Step 507, and then performs Step 509.

Further, in Step 502 shown in FIG. 8, the microcomputer calculates and stores the third pump-supplied air quantity Qt* of each wheel; that is, third pump-supplied air quantity Qtfl, which is the quantity of air that the air pressure generating unit FLA (the air pump AP) provided at the front left wheel FL supplies to the tire air chamber Rb during a single generation and non-generation cycle; third pump-supplied air quantity Qffr, which is the quantity of air that the air pressure generating unit FRA (the air pump AP) provided at the front right wheel FR supplies to the tire air chamber Rb during a single generation and non-generation cycle; third pump-supplied air quantity Qtrl, which is the quantity of air that the air pressure generating unit RLA (the air pump AP) provided at the rear left wheel RL supplies to the tire air chamber Rb during a single generation and non-generation cycle; and third pump-supplied air quantity Qtrr, which is the quantity of air that the air pressure generating unit RRA (the air pump AP) provided at the rear right wheel RR supplies to the tire air chamber Rb during a single generation and non-generation cycle.

The third pump-supplied air quantity Qt* (Qtfl, Qffr, Qtrl, Qtrr) of each wheel is calculated on the basis of the generation-state maintaining time Tmu* (Tmufl, Tmufr, Tmurl, Tmurr) of each wheel, which is calculated and updated in the above described Step 205, and the non-generation-state maintaining time Tmd* (Tmdfl, Tmdfr, Tmdrl, Tmdrr) of each wheel, which is calculated and updated in the above described Step 206.

The generation-state maintaining time Tmu* of each wheel is a time period starting when the tire pressure P* of each wheel reaches the lower limit set value P1 and the corresponding mode sensor is switched from the ON state to the OFF state and ending when the tire pressure P* of the wheel reaches the upper limit set value P2 and the mode sensor is switched from the OFF state to the ON state. The non-generation-state maintaining time Tmd* of each wheel is a time period starting when the tire pressure P* of each wheel reaches the upper limit set value P2 and the corresponding mode sensor is switched from the OFF state to the ON state and ending when the tire pressure P* of the wheel reaches the lower limit set value P1 and the mode sensor is switched from the ON state to the OFF state.

Therefore, the third pump-supplied air quantity Qt* is calculated as follows. The quantity of air leakage per unit time (Q1/Tmd*) is calculated from the total quantity of air leakage Q1 during the non-generation-state maintaining time Tmd* of each wheel (this is also the quantity of air leakage in a time period over which the tire pressure P* of each wheel decreases from the upper limit set value P2 to the lower limit set value P1, and is the same as the above-described total quantity of air leakage Q1 during the above-described down time Tpd* of each wheel), the total quantity of air leakage Q1 being approximately obtained from the state equation (P·Vm=M·R·T) of gas in the pneumatic system including the tire air chamber Rb of each wheel. The total quantity of air leakage Q1 is added to the product of the total quantity of air leakage per unit time (Q1/Tmd*) and the generation-state maintaining time Tmu* (i.e., the quantity of air leakage during the generation-state maintaining time Tmu*) so as to obtain the third pump-supplied air quantity Qt*.

Further, in Step 505 of FIG. 8, the microcomputer outputs an instruction for displaying a message "Mode Sensor, Pressure Sensor, Air Pump: Normal," whereby the message "Mode Sensor, Pressure Sensor, Air Pump: Normal" is displayed on the instrument panel display section ID. In Step 506 of FIG. 8, the microcomputer outputs an instruction for displaying a message "Mode Sensor: Anomalous," whereby the message "Mode Sensor: Anomalous" is displayed on the instrument panel display section ID. In Step 508 of FIG. 8, the microcomputer outputs an instruction for displaying a message "Pressure Sensor: Anomalous," whereby the message "Pressure Sensor: Anomalous" is displayed on the instrument panel display section ID. In Step 509 of FIG. 8, the microcomputer outputs an instruction for displaying a message "Air Pump: Anomalous," whereby the message "Air Pump: Anomalous" is displayed on the instrument panel display section ID. From these messages displayed on the instrument panel display section ID, the driver can recognize whether the pneumatic system devices (the mode sensor, the pressure sensor, and the air pump of each wheel) are normal or anomalous.

In the above-described embodiment, Step 500 is provided for determining whether the relevant pneumatic system devices (the mode sensor, the pressure sensor, and the air pump) are normal or anomalous. However, Step 500 may be removed. In this case, Steps 205 and 206 shown in FIG. 5 become unnecessary. Further, in the above-described embodiment, Step 300 is provided for determining whether each wheel speed sensor is normal or anomalous. However, Step 300 may be removed.

In the above-described embodiment, the electronic control unit ECU is configured to determine whether the wheel speed sensor for each wheel and the pneumatic system devices (the mode sensor, the pressure sensor, and the air pump) of each wheel are normal or anomalous in the above-described manner. However, the electronic control unit ECU may be configured to compare the electronic control unit ECU compares the first pump-supplied air quantity (Qvw*), the second pump-supplied air quantity (Qp*), and the third pump-supplied air quantity (Qt*), which are calculated on basis of the outputs from the wheel speed sensor, the pressure sensor, and the mode sensor. When the value of one pump-supplied air quantity (for example, Qvw*) differs from the remaining two pump-supplied air quantities (for example, Qp* and Qt*), the remaining two pump-supplied air quantities (Qp* and Qt*) are assumed to be correct in accordance with the majority rule, and the sensor (in this case, the wheel speed sensor) whose output is used to calculate the pump-supplied air quantity (Qvw*) is determined to be anomalous.

In the above-described embodiment, the tire-pressure control apparatus comprises a plurality of wheel speed sensors (Swfl, Swfr, Swrl, Swrr) for respectively detecting rotational speeds of a plurality of wheels of a vehicle; a plurality of air pressure generation units (FLA, FRA, RLA, RRA) respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; a plurality of pressure sensors (Spfl, Spfr, Sprl, Sprr) respectively detecting the tire pressures of the plurality of wheels; and a plurality of mode sensors (Smfl, Smfr, Smrl, Smrr) each detecting whether the corresponding air pressure generation unit is in a generation-state or in a non-generation state. For each wheel, the tire-pressure control apparatus comprises wheel-speed-sensor determination means for determining whether the corresponding wheel speed sensor is normal or anomalous on the basis of a detection value of the wheel speed sensor; up-time calculation means for calculating an up time (Tpu*), which is a time period over which the tire pressure of the wheel increases from the lower limit set value to the upper limit set value, on the basis of a detection value of the corresponding pressure sensor; down-time calculation means for calculating a down time (Tpd*), which is a time period over which the tire pressure of the wheel decreases from the upper limit set value to the lower limit set value, on the basis of the detection value of the pressure sensor; average-rotational-speed calculation means for calculating an average rotational speed (V*) of the wheel during the up time calculated by the up-time calculation means, on the basis of the detection value of the wheel speed sensor; first-pump-supplied-air-quantity calculation means for calculating a first pump-supplied air quantity (Qvw*) of the corresponding air pressure generation unit in a single generation and non-generation cycle on the basis of the up time (Tpu*) and the average rotational speed (V*); second-pump-supplied-air-quantity calculation means for calculating a second pump-supplied air quantity (Qp*) of the air pressure generation unit in a single generation and non-generation cycle on the basis of the up time (Tpu*) and the down time (Tpd*); generation-state-maintaining-time calculation means for calculating a generation-state maintaining time (Tmu*), in which the air pressure generation unit is maintained in a generation state, on the basis of a detection value of the corresponding mode sensor; non-generation-state-maintaining-time calculation means for calculating a non-generation-state maintaining time (Tmd*), in which the air pressure generation unit is maintained in a non-generation state, on the basis of the detection value of the mode sensor; third-pump-supplied-air-quantity calculation means for calculating a third pump-supplied air quantity (Qt*) of the air pressure generation unit in a single generation and non-generation cycle on the basis of the generation-state maintaining time (Tmu*) and the non-generation-state maintaining time (Tmd*); system determination means, operable when the wheel-speed-sensor determination means determines that the corresponding wheel speed sensor is normal, for determining whether the corresponding air pump and the corresponding pressure sensor are normal or anomalous on the basis of the difference between the first pump-supplied air quantity (Qvw*) and the second pump-supplied air quantity (Qp*); mode determination means, operable when the system determination means determines that the air pump and the pressure sensor are normal, for determining whether the corresponding mode sensor is normal or anomalous on the basis of the difference between the first pump-supplied air quantity (Qvw*) and the third pump-supplied air quantity (Qt*); and air-pump/pressure-sensor determination means, operable when the system determination means determines that either of the air pump and the pressure sensor is anomalous, for determining which one of the air pump and the pressure sensor is anomalous on the basis of the difference between the first pump-supplied air quantity (Qvw*) and the third pump-supplied air quantity (Qt*). However, the tire-pressure control apparatus may be embodied as in the following first through fifth modified embodiments.

First Modified Embodiment

The tire-pressure control apparatus comprises a plurality of wheel speed sensors (Swfl, Swfr, Swrl, Swrr) for respectively detecting rotational speeds of a plurality of wheels of a vehicle; a plurality of air pressure generation units (FLA, FRA, RLA, RRA) respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of pressure sensors (Spfl, Spfr, Sprl, Sprr) respectively detecting the tire pressures of the plurality of wheels. For each wheel, the tire-pressure control apparatus comprises up-time calculation means for calculating an up time (Tpu*), which is a time period over which the tire pressure of the wheel increases from the lower limit set value to the upper limit set value, on the basis of a detection value of the corresponding pressure sensor; down-time calculation means for calculating a down time (Tpd*), which is a time period over which the tire pressure of the wheel decreases from the upper limit set value to the lower limit set value, on the basis of the detection value of the pressure sensor; average-rotational-speed calculation means for calculating an average rotational speed (V*) of the wheel during the up time calculated by the up-time calculation means, on the basis of the detection value of the wheel speed sensor; first-pump-supplied-air-quantity calculation means for calculating a first pump-supplied air quantity (Qvw*) of the corresponding air pressure generation unit in a single generation and non-generation cycle on the basis of the up time (Tpu*) and the average rotational speed (V*); second-pump-supplied-air-quantity calculation means for calculating a second pump-supplied air quantity (Qp*) of the air pressure generation unit in a single generation and non-generation cycle on the basis of the up time (Tpu*) and the down time (Tpd*); and determination means for comparing the first pump-supplied air quantity (Qvw*) and the second pump-supplied air quantity (Qp*).

Second Modified Embodiment

The tire-pressure control apparatus comprises a plurality of wheel speed sensors (Swfl, Swfr, Swrl, Swrr) for respectively detecting rotational speeds of a plurality of wheels of a vehicle; a plurality of air pressure generation units (FLA, FRA, RLA, RRA) respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of pressure sensors (Spfl, Spfr, Sprl, Sprr) respectively detecting the tire pressures of the plurality of wheels. For each wheel, the tire-pressure control apparatus comprises wheel-speed-sensor determination means for determining whether the corresponding wheel speed sensor is normal or anomalous on the basis of a detection value of the wheel speed sensor; up-time calculation means for calculating an up time (Tpu*), which is a time period over which the tire pressure of the wheel increases from the lower limit set value to the upper limit set value, on the basis of a detection value of the corresponding pressure sensor; down-time calculation means for calculating a down time (Tpd*), which is a time period over which the tire pressure of the wheel decreases from the upper limit set value to the lower limit set value, on the basis of the detection value of the pressure sensor; average-rotational-speed calculation means for calculating an average rotational speed (V*) of the wheel during the up time calculated by the up-time calculation means, on the basis of the detection value of the wheel speed sensor; first-pump-supplied-air-quantity calculation means for calculating a first pump-supplied air quantity (Qvw*) of the corresponding air pressure generation unit in a single generation and non-generation cycle on the basis of the up time (Tpu*) and the average rotational speed (V*); second-pump-supplied-air-quantity calculation means for calculating a second pump-supplied air quantity (Qp*) of the air pressure generation unit in a single generation and non-generation cycle on the basis of the up time (Tpu*) and the down time (Tpd*); and system determination means, operable when the wheel-speed-sensor determination means determines that the corresponding wheel speed sensor is normal, for determining whether the air pressure generation unit and the pressure sensor are normal or anomalous on the basis of the difference between the first pump-supplied air quantity (Qvw*) and the second pump-supplied air quantity (Qp*).

Third Modified Embodiment

The tire-pressure control apparatus comprises a plurality of wheel speed sensors (Swfl, Swfr, Swrl, Swrr) for respectively detecting rotational speeds of a plurality of wheels of a vehicle; a plurality of air pressure generation units (FLA, FRA, RLA, RRA) respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of mode sensors (Smfl, Smfr, Smrl, Smrr) each detecting whether the corresponding air pressure generation unit is in a generation-state or in a non-generation state. For each wheel, the tire-pressure control apparatus comprises generation-state-maintaining-time calculation means for calculating a generation-state maintaining time, in which the air pressure generation unit is maintained in a generation state, on the basis of a detection value of the corresponding mode sensor; non-generation-state-maintaining-time calculation means for calculating a non-generation-state maintaining time, in which the air pressure generation unit is maintained in a non-generation state, on the basis of the detection value of the mode sensor; average-rotational-speed calculation means for calculating an average rotational speed of the wheel during the generation-state maintaining time calculated by the generation-state-maintaining-time calculation means, on the basis of the detection value of the wheel speed sensor; fourth-pump-supplied-air-quantity calculation means for calculating a fourth pump-supplied air quantity of the corresponding air pressure generation unit in a single generation and non-generation cycle on the basis of the generation-state maintaining time and the average rotational speed; third-pump-supplied-air-quantity calculation means for calculating a third pump-supplied air quantity of the air pressure generation unit in a single generation and non-generation cycle on the basis of the generation-state maintaining time and the non-generation-state maintaining time; and determination means for comparing the fourth pump-supplied air quantity and the third pump-supplied air quantity.

Fourth Modified Embodiment

The tire-pressure control apparatus comprises a plurality of wheel speed sensors (Swfl, Swfr, Swrl, Swrr) for respectively detecting rotational speeds of a plurality of wheels of a vehicle; a plurality of air pressure generation units (FLA, FRA, RLA, RRA) respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of mode sensors (Smfl, Smfr, Smrl, Smrr) each detecting whether the corresponding air pressure generation unit is in a generation-state or in a non-generation state. For each wheel, the tire-pressure control apparatus comprises wheel-speed-sensor determination means for determining whether the corresponding wheel speed sensor is normal or anomalous on the basis of a detection value of the wheel speed sensor; generation-state-maintaining-time calculation means for calculating a generation-state maintaining time, in which the air pressure generation unit is maintained in a generation state, on the basis of a detection value of the corresponding mode sensor; non-generation-state-maintaining-time calculation means for calculating a non-generation-state maintaining time, in which the air pressure generation unit is maintained in a non-generation state, on the basis of the detection value of the mode sensor; average-rotational-speed calculation means for calculating an average rotational speed of the wheel during the generation-state maintaining time calculated by the generation-state-maintaining-time calculation means, on the basis of the detection value of the wheel speed sensor; fourth-pump-supplied-air-quantity calculation means for calculating a fourth pump-supplied air quantity of the corresponding air pressure generation unit in a single generation and non-generation cycle on the basis of the generation-state maintaining time and the average rotational speed; third-pump-supplied-air-quantity calculation means for calculating a third pump-supplied air quantity of the air pressure generation unit in a single generation and non-generation cycle on the basis of the generation-state maintaining time and the non-generation-state maintaining time; and system determination means, operable when the wheel-speed-sensor determination means determines that the corresponding wheel speed sensor is normal, for determining whether the air pressure generation unit and the mode sensor are normal or anomalous on the basis of the difference between the fourth pump-supplied air quantity and the third pump-supplied air quantity.

Fifth Modified Embodiment

The tire-pressure control apparatus comprises a plurality of air pressure generation units (FLA, FRA, RLA, RRA) respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; a plurality of pressure sensors (Spfl, Spfr, Sprl, Sprr) respectively detecting the tire pressures of the plurality of wheels; and a plurality of mode sensors (Smfl, Smfr, Smrl, Smrr) each detecting whether the corresponding air pressure generation unit is in a generation-state or in a non-generation state. For each wheel, the tire-pressure control apparatus comprises up-time calculation means for calculating an up time (Tpu*), which is a time period over which the tire pressure of the wheel increases from the lower limit set value to the upper limit set value, on the basis of a detection value of the corresponding pressure sensor; down-time calculation means for calculating a down time (Tpd*), which is a time period over which the tire pressure of the wheel decreases from the upper limit set value to the lower limit set value, on the basis of the detection value of the pressure sensor; second-pump-supplied-air-quantity calculation means for calculating a second pump-supplied air quantity of the air pressure generation unit in a single generation and non-generation cycle on the basis of the up time and the down time; generation-state-maintaining-time calculation means for calculating a generation-state maintaining time, in which the air pressure generation unit is maintained in a generation state, on the basis of a detection value of the corresponding mode sensor; non-generation-state-maintaining-time calculation means for calculating a non-generation-state maintaining time, in which the air pressure generation unit is maintained in a non-generation state, on the basis of the detection value of the mode sensor; third-pump-supplied-air-quantity calculation means for calculating a third pump-supplied air quantity (Qt*) of the air pressure generation unit in a single generation and non-generation cycle on the basis of the generation-state maintaining time and the non-generation-state maintaining time; and determination means for comparing the second pump-supplied air quantity and the third pump-supplied air quantity.

The above-described embodiment is configured to display normal or anomalous states of the wheel speed sensors and the pneumatic system devices (mode sensors, pressure sensors, and air pumps) on the instrument panel display section ID to thereby inform a drive of the normal or anomalous states. However, the embodiment may be modified to inform the driver of the normal or anomalous states (the results of determinations) of the above-described devices by means of an annunciating sound from a speaker.

The invention claimed is:

1. A tire-pressure control apparatus comprising a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of pressure sensors respectively detecting the tire pressures of the plurality of wheels, the tire-pressure control apparatus further comprising for each wheel:
   up-time calculation means for calculating an up time, which is a time period over which the tire pressure of the wheel increases from the lower limit set value to the upper limit set value, on the basis of a detection value of the corresponding pressure sensor;
   down-time calculation means for calculating a down time, which is a time period over which the tire pressure of the wheel decreases from the upper limit set value to the lower limit set value, on the basis of the detection value of the pressure sensor;
   average-rotational-speed calculation means for calculating an average rotational speed of the wheel during the up time calculated by the up-time calculation means, on the basis of the detection value of the wheel speed sensor;
   first-pump-supplied-air-quantity calculation means for calculating a first pump-supplied air quantity of the corresponding air pressure generation unit in a single generation and non-generation cycle on the basis of the up time and the average rotational speed;
   second-pump-supplied-air-quantity calculation means for calculating a second pump-supplied air quantity of the air pressure generation unit in a single generation and non-generation cycle on the basis of the up time and the down time; and
   determination means for comparing the first pump-supplied air quantity and the second pump-supplied air quantity.

2. A tire-pressure control apparatus comprising a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of pressure sensors respectively detecting the tire pressures of the plurality of wheels, the tire-pressure control apparatus further comprising for each wheel:
   wheel-speed-sensor determination means for determining whether the corresponding wheel speed sensor is normal or anomalous on the basis of a detection value of the wheel speed sensor;
   up-time calculation means for calculating an up time, which is a time period over which the tire pressure of the wheel increases from the lower limit set value to the upper limit set value, on the basis of a detection value of the corresponding pressure sensor;
   down-time calculation means for calculating a down time, which is a time period over which the tire pressure of the wheel decreases from the upper limit set value to the lower limit set value, on the basis of the detection value of the pressure sensor;
   average-rotational-speed calculation means for calculating an average rotational speed of the wheel during the up time calculated by the up-time calculation means, on the basis of the detection value of the wheel speed sensor;
   first-pump-supplied-air-quantity calculation means for calculating a first pump-supplied air quantity of the corresponding air pressure generation unit in a single generation and non-generation cycle on the basis of the up time and the average rotational speed;
   second-pump-supplied-air-quantity calculation means for calculating a second pump-supplied air quantity of the air pressure generation unit in a single generation and non-generation cycle on the basis of the up time and the down time; and
   system determination means, operable when the wheel-speed-sensor determination means determines that the corresponding wheel speed sensor is normal, for determining whether the air pressure generation unit and the pressure sensor are normal or anomalous on the basis of the difference between the first pump-supplied air quantity and the second pump-supplied air quantity.

3. A tire-pressure control apparatus comprising a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; a plurality of pressure sensors respectively detecting the tire pressures of the plurality of wheels; and a plurality of mode sensors each detecting whether the corresponding air pressure generation unit is in a generation-state or in a non-generation state, the tire-pressure control apparatus further comprising for each wheel:
   wheel-speed-sensor determination means for determining whether the corresponding wheel speed sensor is normal or anomalous on the basis of a detection value of the wheel speed sensor;
   up-time calculation means for calculating an up time, which is a time period over which the tire pressure of the wheel increases from the lower limit set value to the upper limit set value, on the basis of a detection value of the corresponding pressure sensor;
   down-time calculation means for calculating a down time, which is a time period over which the tire pressure of the wheel decreases from the upper limit set value to the lower limit set value, on the basis of the detection value of the pressure sensor;

average-rotational-speed calculation means for calculating an average rotational speed of the wheel during the up time calculated by the up-time calculation means, on the basis of the detection value of the wheel speed sensor;

first-pump-supplied-air-quantity calculation means for calculating a first pump-supplied air quantity of the corresponding air pressure generation unit in a single generation and non-generation cycle on the basis of the up time and the average rotational speed;

second-pump-supplied-air-quantity calculation means for calculating a second pump-supplied air quantity of the air pressure generation unit in a single generation and non-generation cycle on the basis of the up time and the down time;

generation-state-maintaining-time calculation means for calculating a generation-state maintaining time, in which the air pressure generation unit is maintained in a generation state, on the basis of a detection value of the corresponding mode sensor;

non-generation-state-maintaining-time calculation means for calculating a non-generation-state maintaining time, in which the air pressure generation unit is maintained in a non-generation state, on the basis of the detection value of the mode sensor;

third-pump-supplied-air-quantity calculation means for calculating a third pump-supplied air quantity of the air pressure generation unit in a single generation and non-generation cycle on the basis of the generation-state maintaining time and the non-generation-state maintaining time;

system determination means, operable when the wheel-speed-sensor determination means determines that the corresponding wheel speed sensor is normal, for determining whether the corresponding air pump and the corresponding pressure sensor are normal or anomalous on the basis of the difference between the first pump-supplied air quantity and the second pump-supplied air quantity;

mode determination means, operable when the system determination means determines that the air pump and the pressure sensor are normal, for determining whether the corresponding mode sensor is normal or anomalous on the basis of the difference between the first pump-supplied air quantity and the third pump-supplied air quantity; and air-pump/pressure-sensor determination means, operable when the system determination means determines that either of the air pump and the pressure sensor is anomalous, for determining which one of the air pump and the pressure sensor is anomalous on the basis of the difference between the first pump-supplied air quantity and the third pump-supplied air quantity.

4. A tire-pressure control apparatus comprising a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of mode sensors each detecting whether the corresponding air pressure generation unit is in a generation-state or in a non-generation state, the tire-pressure control apparatus further comprising for each wheel:

generation-state-maintaining-time calculation means for calculating a generation-state maintaining time, in which the air pressure generation unit is maintained in a generation state, on the basis of a detection value of the corresponding mode sensor;

non-generation-state-maintaining-time calculation means for calculating a non-generation-state maintaining time, in which the air pressure generation unit is maintained in a non-generation state, on the basis of the detection value of the mode sensor;

average-rotational-speed calculation means for calculating an average rotational speed of the wheel during the generation-state maintaining time calculated by the generation-state-maintaining-time calculation means, on the basis of the detection value of the wheel speed sensor;

fourth-pump-supplied-air-quantity calculation means for calculating a fourth pump-supplied air quantity of the corresponding air pressure generation unit in a single generation and non-generation cycle on the basis of the generation-state maintaining time and the average rotational speed;

third-pump-supplied-air-quantity calculation means for calculating a third pump-supplied air quantity of the air pressure generation unit in a single generation and non-generation cycle on the basis of the generation-state maintaining time and the non-generation-state maintaining time; and determination means for comparing the fourth pump-supplied air quantity and the third pump-supplied air quantity.

5. A tire-pressure control apparatus comprising a plurality of wheel speed sensors for respectively detecting rotational speeds of a plurality of wheels of a vehicle; a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; and a plurality of mode sensors each detecting whether the corresponding air pressure generation unit is in a generation-state or in a non-generation state, the tire-pressure control apparatus further comprising for each wheel:

wheel-speed-sensor determination means for determining whether the corresponding wheel speed sensor is normal or anomalous on the basis of a detection value of the wheel speed sensor;

generation-state-maintaining-time calculation means for calculating a generation-state maintaining time, in which the air pressure generation unit is maintained in a generation state, on the basis of a detection value of the corresponding mode sensor;

non-generation-state-maintaining-time calculation means for calculating a non-generation-state maintaining time, in which the air pressure generation unit is maintained in a non-generation state, on the basis of the detection value of the mode sensor;

average-rotational-speed calculation means for calculating an average rotational speed of the wheel during the generation-state maintaining time calculated by the generation-state-maintaining-time calculation means, on the basis of the detection value of the wheel speed sensor;

fourth-pump-supplied-air-quantity calculation means for calculating a fourth pump-supplied air quantity of the corresponding air pressure generation unit in a single generation and non-generation cycle on the basis of the generation-state maintaining time and the average rotational speed;

third-pump-supplied-air-quantity calculation means for calculating a third pump-supplied air quantity of the air pressure generation unit in a single generation and non-generation cycle on the basis of the generation-state maintaining time and the non-generation-state maintaining time; and system determination means, operable when the wheel-speed-sensor determination means determines that the corresponding wheel speed sensor is normal, for determining whether the air pressure generation unit and the mode sensor are normal or anomalous on the basis of the difference between the fourth pump-supplied air quantity and the third pump-supplied air quantity.

6. A tire-pressure control apparatus comprising a plurality of air pressure generation units respectively provided for the plurality of wheels and each including an air pump driven through rotation of the corresponding wheel so as to generate compressed air to be supplied to a tire air chamber of the wheel and being capable of maintaining a tire pressure of the wheel between a lower limit set value and an upper limit set value; a plurality of pressure sensors respectively detecting the tire pressures of the plurality of wheels; and a plurality of mode sensors each detecting whether the corresponding air pressure generation unit is in a generation-state or in a non-generation state, the tire-pressure control apparatus further comprising for each wheel:

up-time calculation means for calculating an up time, which is a time period over which the tire pressure of the wheel increases from the lower limit set value to the upper limit set value, on the basis of a detection value of the corresponding pressure sensor;

down-time calculation means for calculating a down time, which is a time period over which the tire pressure of the wheel decreases from the upper limit set value to the lower limit set value, on the basis of the detection value of the pressure sensor;

second-pump-supplied-air-quantity calculation means for calculating a second pump-supplied air quantity of the air pressure generation unit in a single generation and non-generation cycle on the basis of the up time and the down time;

generation-state-maintaining-time calculation means for calculating a generation-state maintaining time, in which the air pressure generation unit is maintained in a generation state, on the basis of a detection value of the corresponding mode sensor;

non-generation-state-maintaining-time calculation means for calculating a non-generation-state maintaining time, in which the air pressure generation unit is maintained in a non-generation state, on the basis of the detection value of the mode sensor;

third-pump-supplied-air-quantity calculation means for calculating a third pump-supplied air quantity of the air pressure generation unit in a single generation and non-generation cycle on the basis of the generation-state maintaining time and the non-generation-state maintaining time; and determination means for comparing the second pump-supplied air quantity and the third pump-supplied air quantity.

* * * * *